US012650570B2

(12) United States Patent
Kühn

(10) Patent No.: US 12,650,570 B2
(45) Date of Patent: Jun. 9, 2026

(54) CABLE INSTALLATION APPARATUS INCLUDING REPLACEABLE DRIVE DEVICE

(71) Applicant: FREMCO A/S, Frederikshavn (DK)

(72) Inventor: Jacob Lindrup Kühn, Sindal (DK)

(73) Assignee: FREMCO A/S, Frederikshavn (DK)

( * ) Notice: Subject to any disclaimer, the term of this patent is extended or adjusted under 35 U.S.C. 154(b) by 556 days.

(21) Appl. No.: 18/257,945

(22) PCT Filed: Dec. 13, 2021

(86) PCT No.: PCT/EP2021/085447
§ 371 (c)(1),
(2) Date: Jun. 16, 2023

(87) PCT Pub. No.: WO2022/128891
PCT Pub. Date: Jun. 23, 2022

(65) Prior Publication Data
US 2024/0053569 A1    Feb. 15, 2024

(30) Foreign Application Priority Data

Dec. 17, 2020    (DK) .............................. PA202070845

(51) Int. Cl.
G02B 6/54        (2006.01)
B65H 51/14        (2006.01)
(Continued)

(52) U.S. Cl.
CPC .............. G02B 6/54 (2013.01); B65H 51/14 (2013.01); B65H 51/16 (2013.01); G02B 6/52 (2013.01); *B65H 2701/32* (2013.01)

(58) Field of Classification Search
CPC . G02B 6/54; G02B 6/52; B65H 51/14; B65H 51/16; B65H 2701/32; H02G 1/086
See application file for complete search history.

(56) References Cited

U.S. PATENT DOCUMENTS 4,469,267 A  *  9/1984  Franchuk ............... B65H 51/14
                                                          226/172
5,813,658 A  *  9/1998  Kaminski .............. B65H 51/14
                                                          254/134.4
(Continued)

FOREIGN PATENT DOCUMENTS

CN        109193475 B      7/2020
DE          3834465 A1     4/1990
(Continued)

OTHER PUBLICATIONS

International Search Report dated Apr. 13, 2022 (3 pages) from PCT Priority Application PCT/EP2021/085447 filed Dec. 13, 2021.
(Continued)

*Primary Examiner* — Andrew Jordan
(74) *Attorney, Agent, or Firm* — Crowell & Moring LLP

(57) ABSTRACT

An apparatus including a blowing chamber having a cable inlet, a cable outlet, and a fluid inlet, wherein the cable outlet is configured to be connected to the duct. A pushing drive, a first drive device including a first conveyer part and a second drive device including a second conveyer part, wherein the conveyer parts are arranged at opposing sides of a cable guidance space and wherein one or both conveyer parts are configured to induce a driving force onto a part of the cable arranged in the cable guidance space. One or both of the first and second drive device includes a base part at which the conveyer part is mounted. The base part is disconnectably connected to a socket part of the apparatus and is maintained in a locked position by a locking system. The coupling arrangement part engages with the drive arrangement part of the apparatus when the base part is connected to the socket part in the locked position.

20 Claims, 5 Drawing Sheets

(51) Int. Cl.
　　*B65H 51/16*　　　　(2006.01)
　　*G02B 6/52*　　　　(2006.01)

(56)　　　　　References Cited

U.S. PATENT DOCUMENTS

| | | | | |
|---|---|---|---|---|
| 5,901,296 | A * | 5/1999 | Lackman | G06F 13/368 |
| | | | | 710/114 |
| 5,967,495 | A * | 10/1999 | Kaminski | G02B 6/50 |
| | | | | 254/134.4 |
| 6,019,351 | A * | 2/2000 | Allen | G02B 6/52 |
| | | | | 254/134.3 R |
| 6,059,264 | A * | 5/2000 | Kaminski | G02B 6/502 |
| | | | | 254/134.3 FT |
| 6,170,804 | B1 * | 1/2001 | Allen | H02G 1/086 |
| | | | | 254/134.4 |
| 6,264,171 | B1 * | 7/2001 | Hoium | G02B 6/50 |
| | | | | 226/35 |
| 6,402,123 | B1 * | 6/2002 | Rivard | G02B 6/52 |
| | | | | 254/134.4 |
| 6,540,208 | B1 * | 4/2003 | Pecot | G02B 6/52 |
| | | | | 254/134.3 R |
| 6,793,202 | B2 * | 9/2004 | Pecot | H02G 1/086 |
| | | | | 254/134.3 R |
| 6,935,040 | B2 * | 8/2005 | Alrutz | H02G 11/02 |
| | | | | 33/759 |
| 8,074,968 | B2 | 12/2011 | Cherix et al. | |
| 8,720,030 | B2 * | 5/2014 | Barker | G02B 6/52 |
| | | | | 29/709 |
| 9,064,410 | B2 * | 6/2015 | Hatano | G08G 1/095 |
| 9,379,049 | B2 * | 6/2016 | Ikeuchi | H01L 23/4334 |
| 9,657,869 | B2 * | 5/2017 | Spijker | G02B 6/502 |
| 10,177,546 | B2 * | 1/2019 | Allen | H01B 17/00 |
| 10,459,186 | B2 * | 10/2019 | Spijker | G02B 6/545 |
| 11,196,237 | B2 * | 12/2021 | Griffioen | H02G 1/086 |
| 11,569,176 | B2 * | 1/2023 | Han | H01L 23/5389 |
| 12,461,328 | B2 * | 11/2025 | Arbuckle | F16B 2/243 |
| 2003/0136952 | A1 * | 7/2003 | Pecot | G02B 6/52 |
| | | | | 254/134.4 |
| 2004/0195287 | A1 | 10/2004 | Bressoud | |
| 2004/0232271 | A1 * | 11/2004 | Alrutz | H02G 11/02 |
| | | | | 242/588.3 |
| 2006/0077554 | A1 * | 4/2006 | Schenk | G02B 5/1866 |
| | | | | 359/569 |
| 2012/0023723 | A1 * | 2/2012 | Barker | G02B 6/52 |
| | | | | 29/407.05 |
| 2013/0117993 | A1 * | 5/2013 | Allen | H01B 17/00 |
| | | | | 29/745 |
| 2014/0202571 | A1 * | 7/2014 | Spijker | G02B 6/502 |
| | | | | 138/108 |
| 2014/0334150 | A1 * | 11/2014 | Hatano | G08G 1/095 |
| | | | | 362/249.02 |
| 2015/0194372 | A1 * | 7/2015 | Ikeuchi | H01L 23/4334 |
| | | | | 257/675 |
| 2017/0299837 | A1 * | 10/2017 | Spijker | G02B 6/545 |
| 2018/0277485 | A1 * | 9/2018 | Han | H01L 23/5389 |
| 2019/0165554 | A1 * | 5/2019 | Griffioen | H02G 1/086 |
| 2023/0163079 | A1 * | 5/2023 | Han | H01L 23/5389 |
| | | | | 257/668 |
| 2023/0400659 | A1 * | 12/2023 | Arbuckle | F16B 2/243 |
| 2024/0045165 | A1 * | 2/2024 | Møller | B65H 51/14 |
| 2024/0053569 | A1 * | 2/2024 | Kühn | H02G 1/086 |
| 2024/0202617 | A1 * | 6/2024 | Ravignon | G06Q 10/063 |
| 2024/0210649 | A1 * | 6/2024 | Møller | G02B 6/54 |
| 2025/0108979 | A1 * | 4/2025 | Chen | B65G 47/82 |

FOREIGN PATENT DOCUMENTS

| | | |
|---|---|---|
| EP | 1 015 928 B1 | 3/2005 |
| EP | 2 883 824 A1 | 6/2015 |
| EP | 3 246 123 A1 | 11/2017 |
| WO | WO 2018/024846 A1 | 2/2018 |
| WO | WO 2018/090043 A1 | 5/2018 |
| WO | WO 2020/076169 A1 | 4/2020 |

OTHER PUBLICATIONS

Written Opinion dated Apr. 13, 2022 (6 pages) from PCT Priority Application PCT/EP2021/085447 filed Dec. 13, 2021.
Office Action dated Mar. 8, 2021 out of Danish Priority Application PA 202070845 (7 pages).

* cited by examiner

CABLE INSTALLATION APPARATUS INCLUDING REPLACEABLE DRIVE DEVICE

This application is a National Stage application of International Application No. PCT/EP2021/085447, filed Dec. 13, 2021, the entire contents of which are incorporated herein by reference.

This application claims priority under 35 U.S.C. § 119(a) to Danish Patent Application No. 2020 70845, filed on Dec. 17, 2020, the entire contents of each of which are incorporated herein by reference.

BACKGROUND OF THE INVENTION

Field of the Invention

The present disclosure relates to an apparatus for installing a cable, such as an optical fiber/fiber cable, into a duct. Moreover, the present disclosure relates to a drive device for installation on an apparatus for installing a cable. Additionally, the present disclosure relates to a set of drive devices and a method of adapting an apparatus for installing a cable, such as an optical fiber cable, into a duct.

Description of the Related Art

The need of installation of cables such as optical fibre/fiber cables for data communication has rapidly increased over the recent years to be able to follow the technological development and increased data communication over the internet and/or internal networks due to e.g. increase in video streaming, online gaming, data mining. The need has also more generally increased as there is a general desire to comply with a need/wish of being able to facilitate a proper data communication and provide a good data communication infrastructure.

Hence, the demand for apparatuses for use during installation of physical infra structure such as cables, such as optical fiber/fibre cables into ducts has increased. In order to be able to provide a more efficient and/or cost efficient installation of such cables, the development of such apparatuses is ongoing.

Patent document WO 2018/090043 A1 discloses such an apparatus including a plurality of components including local controllers where a synchronization between local controllers is provided. A hydraulic clamp cylinder is configured to generate a predetermined normal force on a transmission line between so called tractor drives. Patent document U.S. Pat. No. 8,074,968 another solution for installing cables into a duct. The apparatus includes a cassette through which the cable passes and a driving body for being mounted near a cut out of the cassette. Wheels are mounted on a driving body and driven by a shaft so as to be replaced quickly. Patent document EP 1 015 928 B2 discloses an apparatus including a buckling detector.

The above mentioned solutions however suffers from drawbacks with respect to user friendliness and/or with respect to the range of use of the apparatus.

The present disclosure relates to a solution that may be more user friendly and/or may enable a cost efficient solution for facilitating a wider range of use of an apparatus for installing a cable, such as an optical fiber cable, into a duct. Additionally or alternatively, the present disclosure may provide a solution that may be less exposed to user errors prior to and/or during installation of a cable in a duct/conduit.

SUMMARY

The present disclosure relates to an apparatus for installing a cable, such as an optical fibre/fiber cable, into a duct, with the assistance of a fluid drag, such as by means of a gas, on the cable within the duct. The apparatus includes:

a blowing chamber including a cable inlet and a cable outlet and a fluid inlet for receiving a supply of pressurized fluid, wherein the cable outlet is configured to be connected to the duct, a pushing drive unit, a first drive device including a first conveyer part and a second drive device comprising a second conveyer part.

The conveyer parts are arranged at opposing sides of a cable guidance space and one or both conveyer parts are configured to induce a driving force onto a part of the cable arranged in the cable guidance space. One or both of the first and second conveyer part is configured to be moved towards and away from the cable guidance space. One or both of the first and second drive device includes a base part at which the conveyer part is mounted. Moreover, one or both of the first and second drive device includes a coupling arrangement part configured to engage with a drive arrangement part of the apparatus, wherein the drive arrangement part is configured to be driven by the pushing drive unit. The conveyer part is arranged to be driven by the drive arrangement part of the apparatus. The base part is disconnectably connected to a socket part of the apparatus and is maintained in a locked position by means of a locking system. The coupling arrangement part engages with the drive arrangement part of the apparatus when the base part is connected to the socket part in the locked position.

This may e.g. provide a solution where a user in a fast and easy manner may switch between conveyer parts when desired. This may also help to reduce mistakes when switching between drive devices. For example, if the present situation requires a shift between different types of conveyer parts due to a switch between cables to be installed in a duct, the user may switch between such conveyer parts by switching between different drive device types comprising different types of conveyer devices.

Additionally or alternatively, by means of an apparatus according to the present disclosure, the user may need to only provide/bring a single apparatus to be used for a wider range of cable types and installation situations. Here the user should merely bringing a single apparatus and different types of drive devices to be installed at the apparatus when needed.

The present disclosure may also help to provide an apparatus allowing for easy and cost efficient future adaption of the conveyer arrangement and/or the system for driving the conveyer parts.

The present disclosure may moreover provide a solution that may be more cost efficient compared to the usage range for which it is able to be/can be used.

The drive device(s) may in aspects of the present disclosure include a driven part, such as a shaft connected to the base part by means of one or more bearings, which is connected to the coupling arrangement part so as to be driven by the drive arrangement part of the apparatus.

In one or more aspects of the present disclosure, one or both of the first and second conveyer part may be configured to be moved towards and away from the cable guidance space by means of a movement of the socket part(s).

This may e.g. provide that the apparatus may be more easily adapted to different kinds of conveyer parts.

Additionally or alternatively, when moving the conveyer part(s) towards the guidance space, the conveyer part(s) may induce a clamping force onto the cable jacket.

In aspects if the present disclosure, where a movement of the first and second conveyer parts towards and/or away from the cable guidance space is provided by moving the socket part(s), this may e.g. provide a more mechanically simple design of the drive devices, such as drive devices with fewer movable parts.

In further aspects of the present disclosure, this movement may be configured to be obtained by means of a clamping arrangement comprising a driven clamping part/actuator and a clamping drive unit for controlling the operation of the driven clamping part/actuator.

The clamping arrangement for moving the conveyer part(s) towards and away from the cable guidance space may, e.g., in aspects include the clamping part/actuator such as a threaded rod, a rack, a toothed belt or the like, and a motor, such as an electrical servo motor, which controls the position(s) of the socket and thereby the conveyer part position based on control signals from a controller.

In one or more aspects of the present disclosure, a clamping drive unit such as an electric motor, such as an electric servo motor may be configured to adjust the amount of clamping force provided by the conveyer parts onto the cable in the cable guidance space based on input from a control system.

This may provide a solution that may be more easy to control and operate, and/or may enable usage of conveyer parts of different types in the same apparatus.

The drive unit including the electric servo motor may, e.g., be controlled to adjust the amount of clamping force provide by providing one or more control signals such as a clamping force setting and/or a position setting to it from a control system of the apparatus, and the drive unit hence controls the drive devices(s) so as to apply the desired clamping force to the cable.

In one or more aspects of the present disclosure, the drive device may be configured to be mounted on the socket part by providing a displacement of the base part towards the socket part, and by providing an interlocking operation in order to engage locking parts of the drive device with locking parts of the apparatus.

This may allow fast and easy installation of a conveyer part by a user. Additionally or alternatively, it may provide a solution which is less prone to installation errors when switching between conveyer part types.

In some aspects of the present disclosure, the displacement of the base part towards the socket part may provide that the coupling arrangement part engages with the drive arrangement part.

In one or more aspects of the present disclosure, the interlocking operation may, e.g., include a rotational movement of the base part relative to the socket part around an axis which is parallel to, or coinciding with, a rotation axis defined by the drive arrangement part, so as to engage locking parts of the locking system.

This may e.g. provide a mechanically simple solution for allowing fast and easy installation of another conveyer part by a human user.

In one or more aspects of the present disclosure, the drive device is configured to be disconnected from the socket part by providing a disconnection operation in order to disengage locking parts, of the drive device from locking parts of the apparatus such as from locking parts of the socket/socket part.

In one or more aspects of the present disclosure, the drive device may be configured to be disconnected from the socket part by providing a rotational movement of the base part relative to the socket part around an axis which is parallel to or coinciding with a rotation axis defined by the drive arrangement so as to disengage locking parts of the locking system, followed by a displacement of the base part away from the socket part in a direction parallel to the rotation axis.

In one or more aspects of the present disclosure, the socket part may include one or more first parts of the locking system, and wherein the base part includes one or more second parts of the locking system, and wherein the one or more first parts of the locking system of the socket part is/are configured to engage with the one or more second parts of the locking system of the base part.

This may help to provide that the base part is maintained in the locked position. This may e.g. help to provide a more mechanically simple solution.

In one or more aspects of the present disclosure, an interlocking operation in order to engage the locking system, and/or a disconnection operation in order to disengage the locking system, is/are adapted to be provided by human hand by providing a pushing force, a pulling force and/or a rotational force, such as without the need of a tool.

This may provide a user friendly solution where a fast and efficient exchange of conveyer parts may be provided. Also or alternatively, the solution may require fewer or substantially no tools when switching between conveyer devices, and hence provide a more user friendly solution.

Providing a solution where less or no tools are needed for switching between different conveyer parts, This may help to avoid user mistakes and wrong use, such as e.g. reducing the risk of providing a too tight or loose tightening of the locking system.

In one or more aspects of the present disclosure, the base part may be configured for substantially tool-less mounting and/or dismounting on the socket part.

This may help to provide a user friendly solution that enables a fast switch between different drive devices. In other aspects of the present disclosure, a tool such as a screwdriver (electric or manually driven) or another type of tool may be used for mounting and/or dismounting the drive device.

In one or more aspects of the present disclosure, the locking system includes a spring loaded engagement part, such as one or more spring loaded balls, arranged at the base part and/or the socket part, wherein the spring loaded engagement part is configured to engage with a recessed portion when the base part is in the locked position. The spring loaded engagement part may here in further aspects of the present disclosure be configured to be forced towards a disengagement position by a part of the drive device compressing or stretching a spring member when a disengagement force is provided onto the drive device.

This provides an advantageous way of maintaining the drive device/base in the locked position, while also enabling easy connection/disconnection of the drive device.

The spring loading may in aspects be provided by one or more spring members such as metal springs, a resilient rubber member and/or the like.

The disengagement force may in certain aspects of the present disclosure be adapted to be provided by human hand, e.g. without the need of a tool, and may be sufficient to compress or stretch the spring member.

The spring loaded engagement part may e.g. help to provide a snap lock solution where the user can hear and/or feel when the drive device is in the proper, locked position.

In one or more aspects of the present disclosure, the locking system may include one or more of:

a spring loaded engagement part a latch system, such as a spring loaded latch system, a male and female locking system, where a male part of the locking system is configured to extend into the female part of the locking system when the base part is arranged at the socket part in the locked position, a hook locking system.

This may e.g. be locking means that are configured to be "engaged" and "disengaged" by means of human hands only, or by means of using a tool. Such systems may help to reduce the risk of installation error, such as too tight or loose connection of the drive device. Additionally or alternatively, such locking systems may help to enable fast and easy exchange/switching between drive devices.

In one or more aspects of the present disclosure, the pushing drive unit may comprise a drive motor configured to rotate the drive arrangement part and thereby one or more of the conveyer parts so as to induce the driving force. In further aspects of the present disclosure, the drive motor may be an electric motor such as an electrical servo motor.

Electric motors may provide advantageous control options and/or may help to provide a more cost efficient solution. An electrical servo motor may be more easy to control and/or may provide a larger operation range which enables an apparatus that may be used for installation of a wider range of cable types by switching between conveyer device types on the same apparatus.

In one or more aspects of the present disclosure, the apparatus includes a control system configured to provide one or more control outputs to the pushing drive unit and/or a clamping drive unit, wherein the control system comprises one or more data processors configured to provide the one or more control outputs based on input from one or more input sources such as a user interface and/or one or more sensors.

This may e.g. provide a more user friendly solution where a more autonomous installation of the cable may be provided.

In one or more aspects of the present disclosure, a control system may be configured to provide one or more predefined clamping force settings to a clamping drive unit of the apparatus, in order to control the magnitude of the clamping force applied onto the cable by the conveyer parts.

This may e.g. provide a more safe solution where humanly induced user errors may be reduced. Additionally, it may also provide a more user friendly solution.

Moreover it may help to provide a solution where the risk of applying damages on the cable due to undesired large clamping forces is reduced. This may also be advantageous as the apparatus in aspects of the present disclosure may be configured for installing a wider range of cable types by switching between conveyer part types.

These clamping force settings may in aspects of the present disclosure be predefined by being stored in a data storage and/or by means of an algorithm configured to calculate a clamping force to be applied.

In one or more aspects of the present disclosure, a control system may be configured to control the clamping force applied onto the cable by the conveyer parts based on clamping force sensor input.

This may help to provide a solution which may be user friendly and/or more resistant to failures or undesirable clamping forces acting on the cable.

For example, in one or more aspects of the present disclosure, when a user or the like provides a new clamping force set point, e.g., because the type of cable has been changed and/or if the drive unit(s) have been exchanged/switched to another base unit with a different type of conveyer devices, the desired clamping force may be needed to be changed accordingly to protect the cable, or ensure that enough clamping force is provided dependent on, e.g., the cable type. Smaller optical cable types may need/accept a reduced clamping force in order to protect the cable, whereas larger cables with a larger number of optical fibers and/or different jacket solutions may enable usage of higher clamping forces without damaging the cable.

It is generally understood that the control system in one or more aspects of the present disclosure, may include one or more data processors and/or one or more data storages. Also the control system may include control circuitry/circuitries to control the clamping force applied and/or, e.g., control the drive speed of the conveyer device(s). Additionally it may control the fluid flow applied into the duct.

In one or more aspects of the present disclosure, the control system may be configured to compare clamping force sensor input, and/or a value derived thereof, to a clamping force setting, and provide an output to the clamping drive unit based thereon.

This may e.g. help to provide a more safe and/or user friendly operation.

The clamping force limit value may in aspects of the present disclosure be selected directly or indirectly by a user by means of a user interface of the apparatus.

The clamping force sensor input may generally, in aspects of the present disclosure, be provided by means of a torque measurement of the current consumed by the clamping drive unit, a current measurement value, a sensor arrangement such as a strain gauge sensor arrangement configured to provide an output representative of the force with which the conveying part(s) presses on/clamps the cable and/or the like.

The clamping drive unit, such as a servo motor, may in aspects of the present disclosure be configured to automatically induce the desired clamping force based on a received/selected clamping force setting.

For example, by selecting a specific type of conveying parts among available conveying parts presented by means of the user interface, and/or by selecting a cable type among available cable types presented by means of the user interface, the control system may based thereon be configured to apply a safe clamping force setting adapted to that setup. Alternatively, a user may enter or select a desired clamping force or clamping force range by means of a user interface within which the clamping drive unit should operate for the specific selection of cable and/or conveying device type.

In one or more aspects of the present disclosure, the apparatus may include a data storage including different selectable predefined clamping force settings, and wherein a control system of the apparatus is configured to control the clamping drive unit based on a selected predefined clamping force setting selected from the data storage (e.g., by being presented on a screen of a user interface).

In one or more aspects of the present disclosure, a control system may be configured to provide one or more speed setting outputs in order to control the speed with which the pushing drive unit drives the conveyer part(s), such as based on sensor feedback representative of the movement speed of the cable into the duct.

If the driving force provided on the cable by the conveyer part(s) gets too high and/or the fluid drag in the duct gets too low during the installation, a slip may occur which may induce wear on the cable jacket or even require a restart of the installation of the cable. The speed of the pushing drive unit (50) and hence the speed of the conveyer part(s) may be automatically adapted based on sensor input, e.g. in order to provide a high installation speed while reducing or avoiding slip between the cable and the conveyer part(s).

In one or more aspects of the present disclosure, a first of the said predefined clamping force settings may be configured to be assigned for use when a drive device including a conveying system of a first type is installed at the apparatus, and wherein a second of said predefined clamping force settings is configured to be assigned for use when a drive device including a conveying system of a second type is installed at the apparatus.

In one or more aspects of the present disclosure, the base part of the drive device includes a top surface and a bottom surface. The conveyer part(s) may be arranged at the top surface side of the base part and/or the coupling arrangement part may be arranged at and/or accessible from the bottom surface side of the base part.

This may e.g. provide a mechanically simple solution.

In one or more aspects of the present disclosure, the coupling arrangement part may be configured to physically and/or magnetically engage with the drive arrangement part of the apparatus when the base part is connected to the socket part in the locked position.

In one or more aspects of the present disclosure, the coupling arrangement part and/or the drive arrangement part may include parts such as one or more teeth or jaws that is/are configured to physically engage and couple in order to transfer the drive forces from the pushing drive unit to the driven part such as a shaft. Such parts may, e.g., be designed in order to provide a jaw coupling, a sleeve coupling and/or a toothed wheel coupling between the coupling arrangement part and the drive arrangement part.

In one or more aspects of the present disclosure, the coupling between the coupling arrangement part and the drive arrangement part may include a magnetic coupling, and one or both of the coupling arrangement part and the drive arrangement part may here include a magnet in order to enable magnetic engagement and coupling between the coupling arrangement part and the drive arrangement part.

The top surface side of the base part and the bottom surface side may in aspects be arranged opposite to each other and may face away from each other.

In one or more aspects of the present disclosure, the conveyer part(s) may be connected to a driven part, such as a shaft, through one or more force transferring members such as one or more drive belts, drive chains and or toothed wheels arranged at the drive device, such as wherein the driven part is connected to coupling arrangement part so as to be driven by the drive arrangement part of the apparatus.

In one or more aspects of the present disclosure, the drive device(s) may include a guiding system, such as a passive guidance system, configured to guide the cable, wherein the guiding system includes one or more shafts comprising a rotatable guidance device.

In one or more aspects of the present disclosure, the locking system includes one or more locking parts configured to be displaced between a locking position and an unlocking position, and wherein the one or more locking parts, in the locking position and when the drive device is mounted at the socket part, is/are configured to maintain one or more other locking parts of the locking system in an engaged, locked configuration.

In one or more aspects of the present disclosure, a clamping drive unit, such as a servo motor, such as an electric servo motor, of the apparatus is configured to control the movement of one or both of the first and second conveyer part towards and away from the cable guidance space based on input from a control system.

The present disclosure moreover, in a second aspect, relates to a drive device for installation on an apparatus for installing a cable, such as an optical fibre/fiber cable, into a duct. The drive device includes:

a base part a conveyer part configured to induce a driving force onto a part of a cable a driving part, such as a shaft, configured to drive the conveyer part, a coupling arrangement part directly or indirectly connected to the driving part, wherein the coupling arrangement part is configured to engage with a drive arrangement part of the apparatus.

The drive device, such as the base part, includes one or more locking parts configured to be disconnectably connected to locking parts of the apparatus so that the base part is maintained in a locked position at the socket part, and wherein the coupling arrangement part is configured to engage with the drive arrangement part of the apparatus when the base part is arranged at the socket part in the locked position.

In one or more aspects of the second aspect, the base part of the drive device may include a top surface and a bottom surface, wherein the conveyer part is arranged at the top surface side of the base part, and wherein the coupling arrangement part is arranged at and/or accessible from the bottom surface side of the base part.

In aspects of the present disclosure, the top and bottom surfaces may, or may not, be arranged opposite to each other and/or face away from each other In one or more aspects of the second aspect, the conveyer part is connected to the driving part through one or more force transferring members such as one or more drive belts, drive chains, shafts and/or toothed wheels arranged at the drive device.

In one or more aspects of the second aspect, the one or more locking parts is/are configured to be part of a locking system including one or more of a spring loaded engagement part a latch system, such as a spring loaded latch system, a male and female locking system, where a male part of the locking system is configured to extend into the female part of the locking system when the base part is arranged at the socket part in the locked position, a hook locking system.

This may e.g. be locking means that are configured to be activated and deactiveated by means of human hands only, or by means of using a tool. Such systems may help to reduce the risk of installation error, such as too tight or loose connection of the drive device. Additionally or alternatively, such locking systems may help to enable fast and easy exchange/switching between drive devices.

In one or more aspects of the second aspect, the apparatus may be an apparatus according to any of the above mentioned aspects.

Additionally, the present disclosure relates, in a third aspect, to a set of drive devices, wherein the set of drive devices includes at least two, such as at least four drive devices according to any of the aspects of the second aspect. The set of drive devices includes a first drive device type including a conveying system of a first type, and a second drive device type including a conveying system of a second type, wherein the conveying system of the first type is different from the conveying system of the second type. For example, in one or more aspects of the second or third aspect, the conveying system of the first type may include one or more drive wheels for driving the cable into the duct, and wherein the conveying system of the second type may include one or more conveyer chains or conveyer belts for driving the cable into the duct.

Additionally, the present disclosure, in a fourth aspect, relates to a method of adapting an apparatus for installing a cable, such as an optical fibre/fiber cable, into a duct, such as with the assistance of a fluid drag on the cable within the duct, to be used for installation of different cable types. Here, the apparatus includes a blowing chamber including a cable inlet and a cable outlet and a fluid inlet for receiving a supply of pressurized fluid, wherein the cable outlet is configured to be connected to the duct, a pushing drive unit, and a first drive device including a first conveyer part and a second drive device comprising a second conveyer part. These conveyer parts are arranged at opposing sides of a cable guidance space and one or both conveyer parts is/are configured to induce a driving force onto a part of the cable arranged in the cable guidance space. One or both of the first and second conveyer part may be configured to be moved towards and away from the cable guidance space. One or both of the first and second drive device includes a base part at which the conveyer part of a first type is mounted. Moreover, one or both of the first and second drive device includes a coupling arrangement part configured to engage with a drive arrangement part of the apparatus. The drive arrangement part is configured to be driven by the pushing drive unit. The conveyer part is arranged to be driven by the drive arrangement part of the apparatus. The method includes:

disconnecting one or more of the drive devices including the conveyer part of the first type from the apparatus, providing one or more other drive devices including a coupling arrangement part configured to engage with the drive arrangement part of the apparatus, and a base part at which a conveying system of a second type is mounted, and connecting the one or more other drive devices to the socket part so that the coupling arrangement part engages with the drive arrangement part of the apparatus.

In one or more aspects of the method according to the fourth aspect, the connecting and/or disconnecting may include manipulating a locking system configured to maintain the base part(s) in a locked position where the coupling arrangement part engages with the drive arrangement part of the apparatus.

In one or more aspects of the method according to the fourth aspect, the conveying system of the first type includes one or more drive wheels for driving the cable into the duct. In one or more aspects of the method according to the fourth aspect, the conveying system of the second type includes one or more drive chains or drive belts for driving the cable into the duct.

In one or more aspects of the method according to the fourth aspect, the conveying system of the first type includes one or more drive wheels for driving the cable into the duct, and the conveying system of the second type includes one or more drive chains or drive belts for driving the cable into the duct.

In one or more aspects of the method according to the fourth aspect, the method includes manipulating the locking system directly or indirectly by hand, without assistance of a tool.

In one or more aspects of the method according to the fourth aspect, the method includes providing user input to a control system of the apparatus so as to change a clamping force setting for a clamping drive unit, such as a servo motor, such as an electric servo motor, of the apparatus.

In one or more aspects of the method according to the fourth aspect, the other drive device is mounted on the socket part by:

providing a displacement of the base part towards the socket part so that the coupling arrangement part engages with the drive arrangement, and by providing an interlocking operation in order to engage locking parts of the drive device with locking parts of the apparatus.

In one or more aspects of the method according to the fourth aspect, the apparatus is an apparatus according to any of the above disclosed aspects.

In one or more aspects of the method according to the fourth aspect, the drive devices include drive devices according to any of the aspects of the above mentioned second and/or third aspects.

The present disclosure relates in a fifth aspect to use of an apparatus according to any of the above mentioned aspects, wherein the apparatus is used for installation of different types of cables, such as different types of optical fibre/fiber cables, into a duct with the assistance of a fluid drag provided from the blowing chamber, wherein a switch between different drive devices, including different types of conveying devices, installed at the socket(s) is provided so as enable installation of different cable types, such as cables of different diameter and/or cables comprising different numbers of optical fibers extending within a common outer cable jacket.

In a sixth aspect, the present disclosure relates to use of a drive device according to any of the above mentioned aspects for an apparatus for installing a cable, such as an optical fiber cable, into a duct.

In one or more aspects of the present disclosure, according to the sixth aspect, the use includes switching between different drive devices including different types of conveying devices by installing the different drive devices at a socket part of the apparatus.

In one or more aspects of the present disclosure, according to the sixth aspect, the apparatus may be an apparatus according to any of the above mentioned aspects.

BRIEF DESCRIPTION OF THE DRAWINGS

Aspects of the present disclosure will be described in the following with reference to the figures in which.

DETAILED DESCRIPTION

Figures 1, 2, 3:
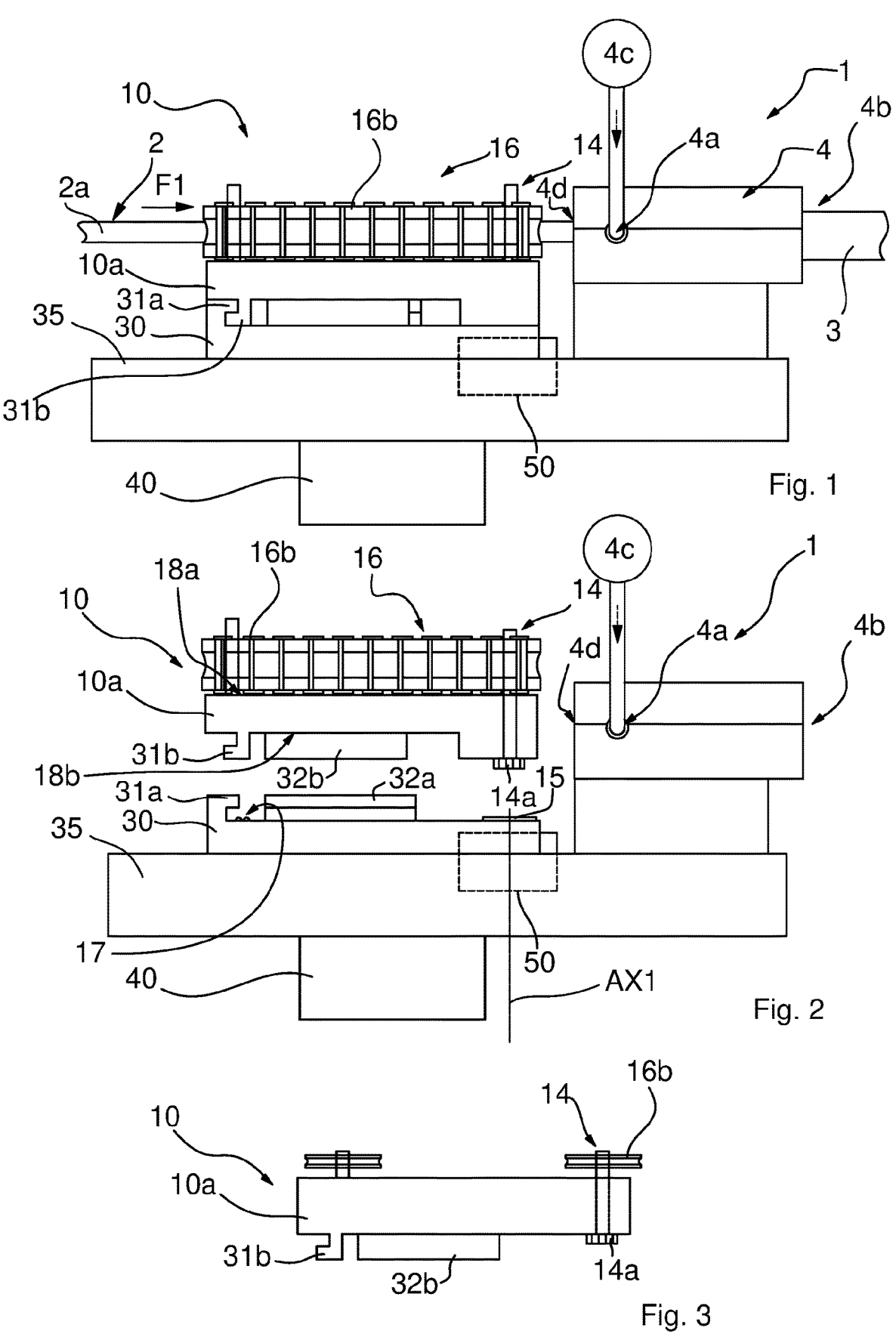
FIG. 1: Illustrates an apparatus for installing a cable according to embodiments of the present disclosure where a replaceable drive device is installed at the apparatus in a locked position.
FIG. 2: illustrates an apparatus for installing a cable according to further embodiments of the present disclosure, where a replaceable drive device has been disconnected/dismounted from a socket of the apparatus.
FIG. 3: illustrates a drive device according to embodiments of the present disclosure, where the drive device comprises another type of conveyer part and may be installed at an apparatus according to embodiments of the present disclosure.

FIGS. 1 and 2 illustrates an apparatus 1 for installing a cable 2, such as an optical fibre/fiber cable, into a duct/conduit 3, with the assistance of a fluid drag, such as by means of a gas such as air or a liquid such as water. The fluid drag acts on the cable within the duct 3.

The apparatus 1 includes a blowing chamber 4 inside a blowing housing. The blowing chamber includes a fluid inlet 4*a* for receiving a pressurized fluid such as a gas such as air. In other embodiments, the fluid may be a liquid such as water. The fluid exits the chamber 4 through the conduit/duct 3 at the fluid outlet 4*b* of the blowing chamber 4, and hence assists to provide a fluid drag onto the cable 2 inside the duct 3. If the fluid is a gas, it may preferably be pressurized by a compressing device 4*c* connected to the inlet 4*a*.

The cable 2 may be an optical fiber cable including one or a plurality of optical fibers extending inside the cable sleeve 2*a*. The apparatus may be configured to install cables of different types, such as cables with different diameters, cables having different resistance to clamping forces, cables including only one, two or ten optical fibers therein or cables including, e.g., more than 20, more than 40 or more than 60 optical fibers extending inside the common sleeve 2*a*. These cables may also have different stiffness and/or be made from different materials with respect to the sleeve material and/or insulation material or barriers inside the sleeve.

In one or more embodiments of the present disclosure, the apparatus may be suitable for installation of cables in a duct/conduit that is longer than 200 meters, such as longer than 800 meters, such as longer than 1500 meters. The conduit 3 may hence e.g. be between 200 meters and 8000 meters in length, such as between 500 meters and 5000 meters, such as between 900 meters and 3000 meters in length.

The fluid outlet 4*b* hence also acts as the cable outlet and the outlet 4*b* may hence in embodiments of the present disclosure be configured to be connected to the duct 3 at the inlet end of the duct in a substantially fluid tight manner, such as by means of a gasket arrangement providing a fluid tight connection to the duct, such as the outer surface of the duct. Different sizes of ducts 3 may in embodiments of the present disclosure be connected to the blowing chamber outlet by switching between different sizes of gaskets and/or bushings.

A controllable fluid compressor 4*c* such as a compressor is connected to the fluid inlet 4*a* in order to provide pressurized fluid into the blowing chamber 4. The compressor 4*c* and/or a valve arrangement (not illustrated) may in embodiments of the present disclosure be controlled by a user or a controller of a control system of the apparatus (see more details below and/or FIG. 8) in order to adjust the magnitude of the fluid flow and hence the fluid drag acting on the cable inside the tube. The fluid drag may in embodiments of the present disclosure be increased, e.g. gradually by a user or a control system including a computer processor executing software code, during installation of the cable, in order to maintain a sufficient fluid drag inside the duct 3.

The fluid compressor 4*c*, such as a compressor, may either be considered as a part of the apparatus 1 or be an external part of the apparatus 1 mainly considered as a source of pressurized fluid.

The blowing chamber 4 also comprises a cable inlet 4*d* for receiving a cable to be installed into the duct 3. The cable 2 is supplied to the cable inlet 4*d* from a conveyer arrangement 16.

The conveyer arrangement 16 is configured to frictionally engage the outer cable sleeve of the cable 2 surrounding elongated structures such as optical fiber(s) inside the sleeve, and apply a motive drive force/pushing force F1 onto the cable arranged in a cable guidance space 13. For this purpose, the conveyer arrangement 16 includes a first conveyer part 16*a* and a second conveyer part 16*b* (only one conveyer part is illustrated in FIGS. 1-2 due to the side view). These conveyer parts 16*a*, 16*b* are arranged at opposing sides of the cable guidance space 13, see FIG. 7. One or both conveyer parts 16*a*, 16*b* are configured to frictionally engage with the cable and to be driven by a pushing drive unit 50 of the apparatus. Thereby, the driving force F1 is applied onto a part of the cable sleeve arranged in the cable guidance space 13, so that the cable is pushed by the conveyer arrangement 16 into the blowing chamber 4 through the inlet 4*d*, and therefrom into the duct 3 through outlet 4*b*.

The pushing drive unit 50, such as a motor, e.g. an electric motor, such as a servo motor, e.g. an electric servo motor, controls the movement of the conveyer part(s) 16*a*, 16*b*. The drive speed of a pushing drive unit 15 (described in more details later on) that is driven by the driven unit 50 determines the rotation speed of the conveyer part(s) 16*a*, 16*b* and hereby the speed with which the cable 2 is driven into the duct 3.

It is understood that only one of the conveyer part(s) 16*a*, 16*b* in embodiments of the present disclosure may be driven by the pushing drive unit 50 by means of a driven part 14, such as including a shaft, connected to the pushing drive unit. Hence, the other conveyer part may here be a passive conveyer part that merely is running together with the cable and not connected to the pushing drive unit to be driven by this. Instead, the "active" conveyer part 16*a*, 16*b* driven by the drive unit 50 provides the pushing force onto the cable, and the other passive conveyer part merely act as a counter hold but may never the less also move by the motive force transferred to the passive conveyer part through the cable, so that the cable moves the passive conveyer part.

In other embodiments of the present disclosure, both the conveyer part 16*a*, 16*b* may be "active" conveyer parts that provides the pushing force from opposite sides of the cable 2 and cable guidance space 13. This may in some embodiments of the present disclosure be provided by means of a single pushing drive unit 50 connected by a drive force transferring arrangement to driven parts 14 that are connected to each their conveyer part 16*a*, 16*b*. In other embodiments, it may be provided by two individual pushing drive units 50 connected by a drive force transferring arrangement to each their conveyer part 16a, 16b through one or more driven parts 14 such as one or more shafts.

Figure 7:
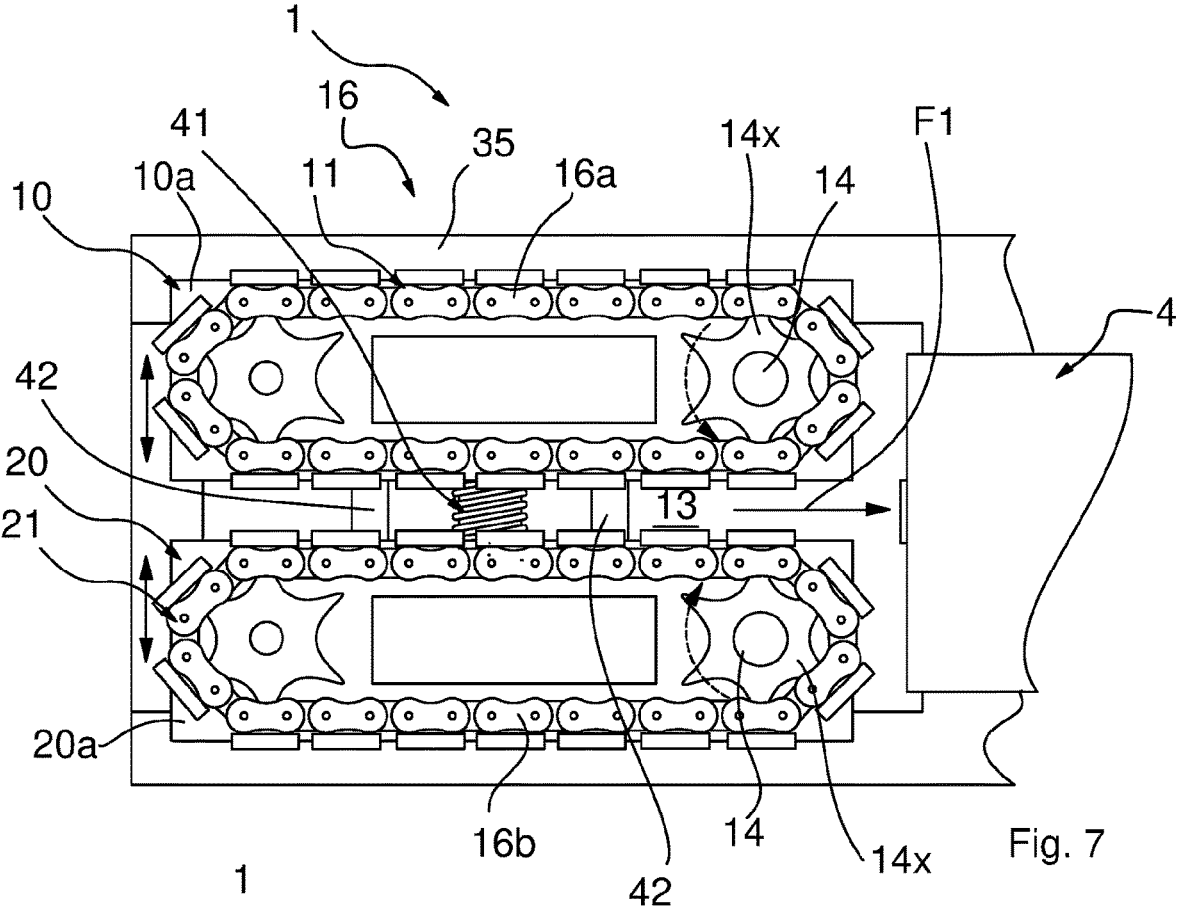
FIG. 7: illustrates an apparatus including a clamping arrangement according to further embodiments of the present disclosure.

A first drive device 10 includes the first conveyer part 16a, and a second drive device 20 comprises the second conveyer part 16b, see also FIG. 7.

One or both of the first and second conveyer parts 16a, 16b is configured to be moved towards and away from the cable guidance space 13 by means of a clamping arrangement that in embodiments of the present disclosure may include a drive unit 40, such as a servo motor, such as an electric servo motor, of the apparatus 1. This clamping drive unit 40 is configured to control the movement of one or both of the first and second conveyer part 16a, 16b towards and away from the cable guidance space 13. In other embodiments of the present disclosure, the clamping arrangement may include a spring arrangement (not illustrated) where one or more adjustable, pre-tensioned mechanical springs presses directly or indirectly onto one or both of the conveyer parts 16a, 16b (or a base part 10a, 20a or a socket 30) in order to provide a clamping force onto the cable. Hence, by adjusting the pre-tensioning the spring(s), the clamping force applied onto the cable may be adjusted. The clamping drive unit 40 may here in further embodiments of the present disclosure be configured to adjust the pre-tensioning of the mechanical spring(s), such as coil springs or leaf springs to induce the desired clamping force.

One or both of the first and second drive device 10, 20 includes a base part 10a, 20a (see also FIG. 4) at which the respective conveyer parts 16a, 16b are mounted.

One or both of the first and second drive device 10, 20 comprises a coupling arrangement part 14a configured to engage with a drive arrangement part 15 of the apparatus 1. The drive arrangement part 15 is configured to be driven by the pushing drive unit 50. Hence, the conveyer parts 16a, 16b is/are arranged to be driven by the drive arrangement part 15 of the apparatus when the coupling arrangement part 14a engages/couples with the drive arrangement part 15.

The coupling arrangement part 14a and the drive arrangement part 15 may in embodiments of the present disclosure comprise parts such as one or more jaws and/or teeth that are configured to physically engage and couple in order to transfer the drive forces from the pushing drive unit 50 to the driven part 14 such as a shaft. One or more of the parts 14a, 15 may, e.g., in embodiments of the present disclosure include one or more jaws in order to provide a jaw coupling between the devices 14a, 15. In one or more embodiments of the present disclosure, one or more of the parts 14a, 15 may include or be a sleeve solution in order to provide a sleeve coupling. In still further embodiments of the present disclosure, one or more of the parts 14a, 15 may include or be one or more toothed wheels. The parts 14a, 15 may in some embodiments provide a gearing between these toothed wheels, or a gearing solution may be omitted.

In embodiments of the present disclosure, the coupling between the parts 14a, 15 may be or include a magnetic coupling. The magnetic force from the magnetic coupling may in embodiments hereof be configured to be strong enough to avoid a sliding between the parts 14a, 15 during operation such as normal operation of the apparatus. Hence, in this embodiments, the magnetic coupling may be configured to provide a non-physical engagement between the parts 14a, 15. In some embodiments, one or more partition walls (e.g., of the socket and/or base part) may be configured to be placed between the parts 14a, 15. In other embodiments, the parts 14a, 15 may be configured to touch and magnetically engage during operation when the drive device(s) is in the locked position. In some embodiments of the present disclosure, the magnetic coupling may be configured to allow a relative, rotational movement between parts 14a, 15 in case, e.g., a too large driving torque is applied. This may provide a safety measure. However, the pushing drive unit 50 and/or control system 100, 200 may in some embodiments provide a safety measure for avoiding overloading, in some embodiments, the feature of allowing a relative movement between parts 14a, 15 may be omitted.

In embodiments of the present disclosure, the magnetic coupling and physical coupling by means of e.g. toothed wheel coupling, jaw coupling or sleeve coupling or the like may be combined.

The base part(s) 10a, 20a is/are disconnectably connected to each their socket part 30 of the apparatus 1, and is/are maintained in a locked position by means of a locking system 31a, 31b, 32a, 32b, 17. The coupling arrangement part 14a engages with the drive arrangement part 15 of the apparatus 1 when the base part 10a, 20a is connected to the socket part 30 in the locked position.

In FIG. 1, the drive device 10 is connected in the locked position to the socket part 30. After releasing/disengaging the locking system, the drive device 10 can be easily removed from the socket as e.g. illustrated in FIG. 2. to e.g. be exchanged with another drive device comprising a conveyer part/system 16a, 16b of another type and/or size, or merely to exchange it with a drive device having a similar conveyer part/system e.g. in case of malfunction, wear or occurring soiling.

The base part 10a, 20a may, e.g., be made from a metal such as aluminum, brass, steel, a plastic material and/or a fiber material or fiber fibre reinforced material. The locking parts 31b, 32b, may be milled out in the base parts material 10a, 20a or may be attached thereto by mechanical and/or chemical fasteners. In other embodiments, the base parts 31b, 32b and the main body of the base part may be molded in one piece.

As can be seen, the drive device(s) 10, 20 that are configured for installation on the apparatus includes the a base part 10a, 20a, and a conveyer part 16a, 16b configured to induce a driving force F1 onto a part of a cable 2 when the apparatus is in use and the drive device(s) is/are mounted in the locked position(s). Additionally, the drive device(s) includes the coupling arrangement part 14a configured to engage with the drive arrangement part 15 of the apparatus 1. The coupling arrangement part 14a is configured to drive the conveyer part 16a, 16b by forces transferred from the pushing drive unit 50 to the coupling arrangement part 14a through the drive arrangement part 15. Additionally, the base part(s) 10a, 20a includes one or more locking parts 31b, 32b, 17 configured to be disconnectably connected to locking parts 31a, 32a, 17 of the apparatus 1 so that the base part 10a, 20a is maintained in the locked position at the socket part 30.

The base parts 10a, 20a may be arranged between the respective conveyer part/system 16a, 16b and the socket part 30 when installed at the apparatus.

The drive device 10, 20 may be designed so that the base part 10a, 20a includes a top surface 18a facing away from the socket part 30, and a bottom surface 18b for facing the socket part. Here, the conveying system 16 is arranged at the top surface 18a side of the base part 10a, 20a, and the coupling arrangement part 14a may here be arranged at and/or accessible from the bottom surface side 18b of the base part 10a, 20a.

The top surface 18a faces away from socket 30 and may in some embodiments of the present disclosure be configured to face upwards and away from the ground during installation so that the rotation axis of the 14 is substantially vertical. In other embodiments of the present disclosure (not illustrated), the top surface 18*a* may be configured to face e.g. sideways) so e.g. rotation axes of the shaft 14 may be substantially horizontal. But the axis of rotation of the shaft(s) may also in still further embodiments be somewhere between horizontal and vertical. This may depend on the type and constitution of the apparatus 1.

Figure 4:
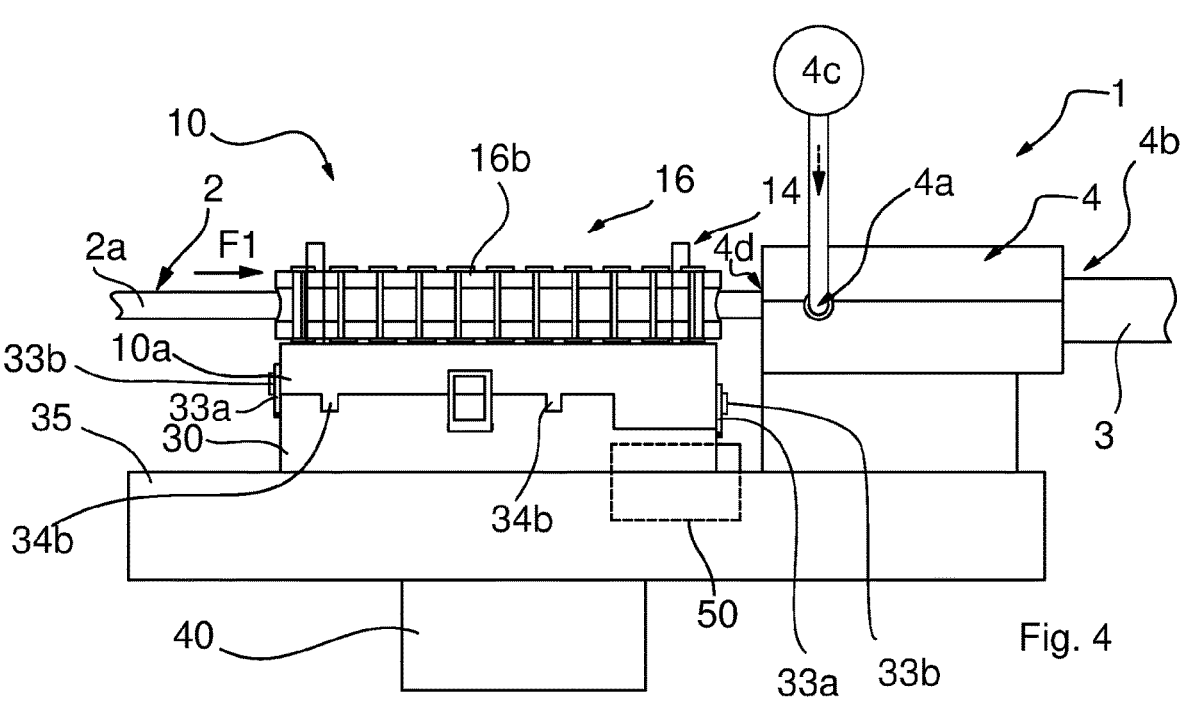
FIGS. 4-5: illustrates an apparatus for installing a cable according to embodiments of the present disclosure with a locking system according to further embodiments of the present disclosure.

In FIGS. 1-2 and 4, the conveying system/arrangement 16 is of a first type and hence includes one or more conveyer chains for driving the cable (2) into the duct.

FIG. 3 illustrates a drive device 10 to be installed onto the socket/socket part 30 of the apparatus. This drive device includes a different type of conveyer arrangement than the drive device illustrated in FIGS. 1-2 and 4. The drive device here includes a conveyer part 16*b* in the form of a drive wheel that is driven by the shaft 14. The drive wheel is here directly driven by the shaft 14, but it may also be driven by a drive belt or the like in further embodiments (not illustrated). The drive device 10, 20 may also generally include a passive guide 60 such as a further wheel that may be arranged on the base part and, e.g., include a wheel or the like that is rotated by the cable. This passive guide may help to align the cable. The parts of the locking system of the drive device to be installed at the apparatus 1 may be substantially similar to those parts of the locking system of the drive device which is present on the drive device to be replaced. Hence the drive devices having different types of conveyer parts may have at least some of the parts of the locking system that are substantially similar in order to be able to fit onto the same socket. That the, different locking systems may in some embodiments of the present disclosure be used for different drive devices, and in that case, the apparatus 1, such as the socket 30, should be able to engage with locking systems of both drive devices.

A further type of conveyer types 16*a*, 16*b* that the drive device(s) 10, 20 may include may be a conveyer belt system or the like for frictionally engaging with the cable.

Hence, by bringing sets of drive devices 10, 20 with different conveyer arrangement types to an installation location together with a single apparatus, the apparatus 1 can easily be adapted with varying types of conveyer arrangements for installation of cables 2, such as different types, thickness, stiffness and/or the like.

The drive devices 10, 20 may also include different sizes and/or configurations of the same conveyer arrangement types. For example different conveyer wheels having different configurations of contact surfaces for frictionally engaging with the cable sleeve surface, or different sizes such as different diameters, different configurations and/or sizes of conveyer belts different conveyer chain configurations and/or the like may be arranged at different drive devices 10, 20, and a user may easily switch between such conveyer arrangements of the same type but different configurations or sizes by switching between different drive device 10, 20 types.

Also or alternatively, the user may switch between different conveyer types such as from a conveyer chain to a conveyer belt or conveyer wheel solution and vice versa.

Accordingly, a human user may bring two (or more) different sets of drive devices. The first set may for instance include a first drive device 10, 20 type including a conveying system 16*a*, 16*b* of a first type, and the second set may include a drive device 10, 20 type including a conveying system 16*a*, 16*b* of a second type, and it is here understood that the conveying system of the first type is different from the conveying system of the second type. Hence, a user may easily switch between the drive device types dependent on need/situation, and hence a single apparatus may thus easily be configured to be used for a wide range of cable 2 types and installation situations.

The locking system may in embodiments of the present disclosure include one or more sets of locking parts 31*a*, 31*b*, 32*a*, 32*b*, 17 configured to interlock/engage with each other when the base part is placed in the locked position and the coupling arrangement part 14*a* engages with a drive arrangement part 15 of the apparatus 1.

In the embodiment of FIGS. 1 and 2, the locking system includes three locking system sets. The first set 31*a* and 31*b* includes hook shaped members that engages with each other when moving the base towards a locked position. The same applies for the second set 32*a*, 32*b*. Moreover, the third set may include one or more spring loaded engagement parts 17. This spring loaded engagement part is arranged at one of the base part 10*a* and socket 30. In some embodiments, the spring loaded engagement part may be or comprise a one or more spring loaded balls or pins arranged at the base part 10*a* and/or the socket part 30. The spring loaded engagement part is configured to engage with a recessed portion (not illustrated) in the other of the base part or socket when the base part 10*a*, 20*a* is in the locked position. This helps to maintain the base part 10*a* in the locked position. When a human user provides a disengagement/unlocking force to the base part in a predetermined direction, such as away from or towards the cable guidance space 13, the spring loaded engagement part 17 will be forced towards a disengagement position by a part of the drive device, such as an edge of the base part 10*a* encircling or bordering the recessed portion into which the spring loaded engagement part extends, thereby compressing the spring member (not illustrated) acting on the spring loaded engagement part 17. The spring loading of the spring loaded engagement part(s) may in embodiments of the present disclosure be provided by means of one or more spring members such as metal springs, a resilient rubber member and/or the like.

In the embodiment of FIGS. 1-3, the drive device 10, 20 is configured to be mounted on the socket part 30 by providing a displacement of the base part 10*a*, 20*a* towards the socket part 30 so that the engagement arrangement 14*a* engages with the drive arrangement 15. After this, an interlocking operation is provided in order to engage locking parts 31*b*, 32*b*, 17 of the drive device 10, 20 with locking parts 31*a*, 32*a*, 17 of the apparatus.

In some embodiments of the present disclosure, the interlocking operation may include a rotational movement of the base part 10*a*, 20*a* relative to the socket part. This may be provided 30 around an axis which is parallel to, or coinciding with, a rotation axis AX1 defined or determined by the drive arrangement part 15, so as to engage locking parts 31*a*, 31*b*, 32*a*, 32*b*, 17 of the locking system. Here, in a first step, the first drive device 10 may be moved towards the drive arrangement 15 to engage the engagement arrangement 14*a* with the drive arrangement 15. Hence, at that point, the base part 10*a* is rotated/displaced by hand around e.g. the axis AX1 in a second step, so that the hook shaped members 31*a* and 31*b* and 32*a*, 32*b* engages with each other. Finally, the spring loaded member(s) 17 will engage a recess and thereby keep the hook shaped members engaged, and hence the first drive device 10 is placed in the locked position. By providing a reversed/oppositely directed force, the spring loaded member(s) 17 will disengage and the hook shaped members 31a and 31b and 32a, 32b disengages. Then the first drive device 10 can then be moved away from the socket, e.g. in the direction parallel to the axis AX1, and another drive device including a conveyer arrangement 16a, 16b of a suitable, desired type may be installed instead as, e.g., described above.

As can be seen, the base part may generally support on the socket part 30 and may also engage with the socket part 30.

It is generally understood that the above mentioned locking system represents one way of providing a locking system for keeping the drive device 10, 20 in the desired, locked position, and that other locking systems may be implemented in further embodiments of the present disclosure as e.g. described below.

Figure 5:
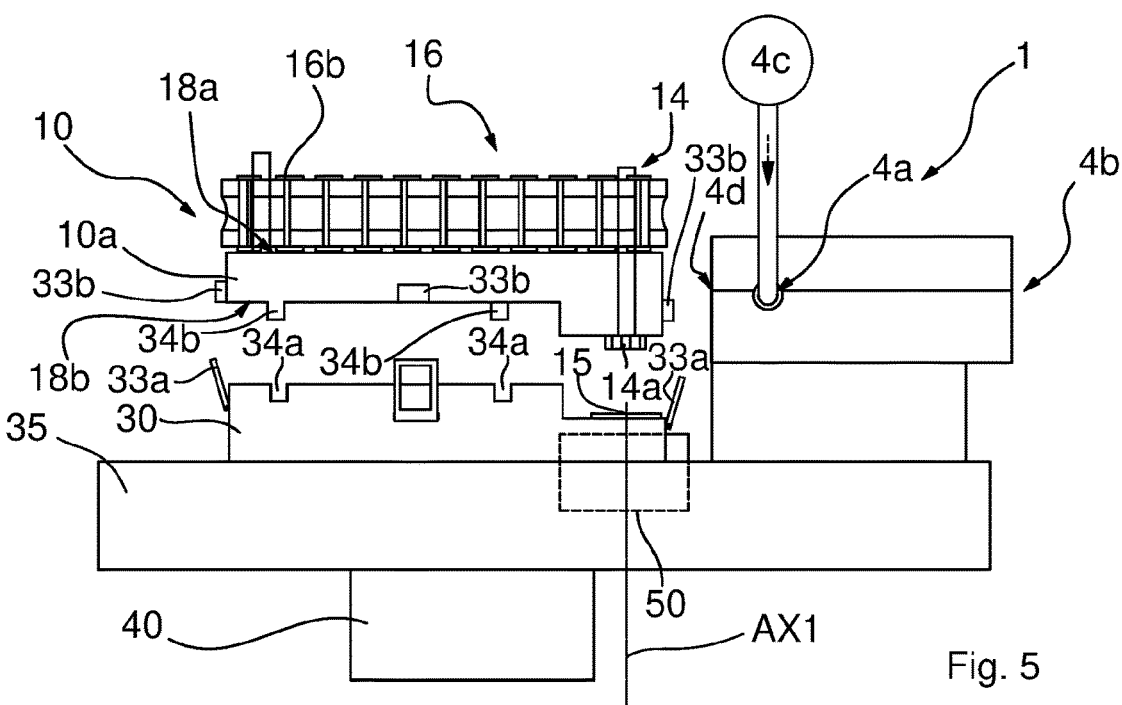

FIGS. 4-5 Illustrates an apparatus 1 according to further embodiments of the present disclosure, where the locking system includes a combination of a clips/latch system 33a, 33b and a male 34b+female 34a locking system.

The clips latch system 33a, 33b may include a protrusion 33b (or a recess), and a movable latching part 33a. In FIGS. 4-5, the latching part(s) 33a are placed at the socket 30 whereas the protrusion is placed at base part 10a. In other embodiments of the present disclosure, these may switch places so that the latching part(s) 33a is/are placed on the drive device 10a instead whereas the protrusion 33b may be placed on the socket 30 or a part of the frame 35 of the apparatus 1. In some embodiments, the latching part(s) 33a or 33b may be placed at another location than the socket. In some embodiments, the protrusions 33b may be replaced with a recess instead.

The latching part 33a may be movable by human hand (or automatically by movement by a motor such as an electric motor, a spring arrangement or the like—not illustrated) between an unlocked position (see FIG. 5) and a locked position (see FIG. 4).

The male part(s) 34b of the locking system is configured to extend into the female part(s) 34a (see FIG. 4) when the base part 10a is arranged at the socket part 30 so the coupling arrangement part 14a engages with the drive arrangement part 15 of the apparatus 1. This male/female arrangement may help to provide a proper fixation of the base part 10a, 20a and hence the drive device 10, 20 relative to the socket 30. When the male/female parts 34a, 34b engages, the latch system can be moved to the locked position in so that the latch(es) 33a and the protrusion(s) engages in order to secure and maintain the base part in the locked position.

It is understood, that in one or more embodiments of the present disclosure (not illustrated), the protrusion with which the latch 33a is configured to engage may be provided by the upper surface 18a of the base part 10a in stead of at sides of the base part as illustrated in FIGS. 4-5.

In still further embodiments of the present disclosure (not illustrated), the locking system may include one or more bolts or screws configured to keep the base part 10a and the socket 30 locked together in the locked position. This/these bolt(s) or screw(s) may in embodiments of the present disclosure be configured to be hand operated without the need of a tool, and may comprise a handle part for the purpose of operating the bolt or screw for fastening and releasing the bolt. In further embodiments of the present disclosure, the bolt(s) or screw(s) may include a torque socket screw head, a hexagonal socket screw head, a star socket screw head or any other suitable type of screw head configured to receive a screw driver or the like. One or more of this/these bolts may extend through a hole in one of the base part 10a or socket 30, and engage with a thread in the other of the base part 10a or socket 30. For example, it may extend through or into a hole or cutout in the base part and engage with a thread in the socket.

Figure 6:
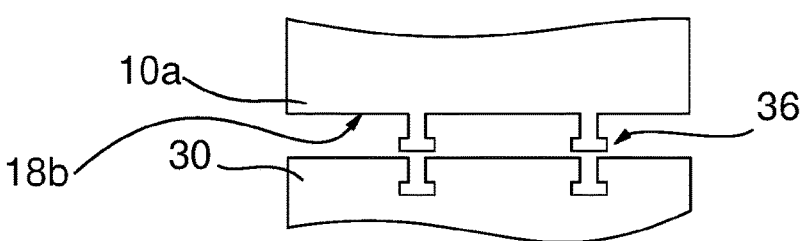
FIG. 6: illustrates a locking system or a part thereof according to a further embodiment of the present disclosure.

FIG. 6 illustrates a simplified embodiment of a locking system according to further embodiments of the present disclosure where the locking system includes a rail solution 36. Here, the socket 30 includes elongated slits (one slit may however be provided in further embodiments) providing a trail for receiving a protrusion on the base part 10a at the lower surface 18b. Hence, the base part 10a may, e.g., be displaced linearly from an end or side of the socket 30 and in over the socket 30 towards the locked position. One or both of the trail and protrusions may switch place so that the trail is placed in the base part 10a and the protrusion for being displaced in the trail is placed at the socket 30. When at the locked position, one or more of, e.g., a spring loaded pin or ball 17, a latch arrangement 33, 34 and/or bolt/screw solution as described above may be used for further fixating the base part in the locked position.

Generally in further embodiments of the present disclosure, in order to engage the coupling arrangement part 14a and drive arrangement part 15 of the apparatus 1, e.g. the shaft 14 (see FIGS. 1-5) or a part thereof or connected thereto may be axially displaceable relative to the base part 10a to allow a displacement of the coupling arrangement part 14a so it engages with the drive arrangement part 15 of the apparatus 1. This may e.g. be relevant in case the engaging/coupling of the coupling arrangement part 14a and the drive arrangement part 15 is configured to take place after the base part is secured in the locked position, as opposed to the solution illustrated in FIGS. 1-2 where the coupling/engaging between the coupling arrangement part and the drive arrangement part 15 takes place before the base part 10a is placed in the locked position.

It is generally understood that various locking solutions 31a, 31b, 32a, 32b, 33a, 33b, 34a, 34b, 36, 17 of the locking system as described above may be combined in further embodiments of the present disclosure. For example, the spring loaded pin or ball(s) 17 illustrated in FIGS. 1-2 may be replaced with the latch system 33a, 33b. Alternatively, these may be used in combination. Additionally or alternatively, the hook solution 31a, 31b, 32, 32b of FIGS. 1-2 may be replaced with the male/female solution 34a, 34b and/or the rail solution 36. Additionally or alternatively, the hook solution 31a, 31b, 32, 32b of FIGS. 1-2 may be combined with the male/female solution 34a, 34b.

In still further embodiments of the present disclosure, the bolt/screw solution above may be combined with the hook solution 31b, 31b, 32b, 32b and/or male/female 34a, 34b solution, and hence, e.g. the spring loaded pin/ball(s) 17 and/or latch system 33a, 33b may be omitted. However, one or both of the spring loaded pin/ball(s) 17 solution and/or latch system 33a, 33b may also be combined with the screw/bolt solution in still further embodiments of the present disclosure, e.g. to assure an increased assurance of the drive device being maintained in the locked position during operation.

FIG. 7 illustrates schematically an apparatus 1 according to embodiments of the present disclosure, seen from above, including a clamping arrangement. The clamping arrangement provides that one or both of the first and second conveyer part 16a, 16b is/are configured to be moved towards and away from the cable guidance space 13, and this may provide or enable a control of the clamping force/ normal force acting on the cable in the cable guidance space 13. This movement may preferably be obtained by a movement of the socket part(s) 30 onto which the respective drive device 10, 20 is mounted. It is generally to be understood that one or both of the drive devices 10, 20 may be a drive device as described above, where a locking system maintains a base part 10a, 20a of the drive device in the locked position, and where the rive device is disconnectably attached and/or connected to the socket part.

The clamping arrangement may include at least one clamping drive unit 40 (see FIGS. 1-2 and 4-5) comprising an electric motor, such as an electric servo motor, configured to be controlled by a clamping force control system. Hence, the clamping drive unit 40 controls a driven clamping part/actuator 41, such as a rack and toothed wheel arrangement, a threaded rod arrangement (as illustrated) or another linear actuator arrangement configured to move one or both of the first and second conveyer parts 16a, 16b towards and away from the cable guidance space 13 (by e.g. moving the socket(s) 30. Hereby, the applied clamping force may in embodiments of the present disclosure be controlled. This control may in further embodiments of the present disclosure e.g. be based on a clamping setting such as a clamping force setting such as based on one or more sensor input. For example, by reducing the distance between the parts of the conveyer parts 16a, 16b facing the cable guidance space 13, and thereby reducing the width of the cable guidance space 13, a larger clamping force will be applied onto the cable. Increasing the distance between the parts of the conveyer parts 16a, 16b facing the cable guidance space 13 will reduce the clamping force.

This movement may also allow/be designed/suitable for an adjustment when switching between drive device 10, 20 types in order to use different types, designs and/or sizes of conveyer arrangements 16a, 16b. For example when switching between a conveyer chain or belt and to a conveyer wheel, the width of the cable guidance space may need to be reduced or increased in order to fit to the new type of cable to be installed and/or in order to adapt to the new type of drive device 16a, 16b type.

The driven clamping part/actuator 41 may preferably be directly or indirectly connected to one or both socket(s) 30, but in some other configurations it may also be connected to the base part(s) 10a, 20a instead.

In some embodiments of the present disclosure, the clamping arrangement may include a spring arrangement (not illustrated) where one or more adjustable, pre-tensioned mechanical springs such as one or more coil springs or leaf springs to, induce the desired clamping force. These/this spring may directly or indirectly induce a spring force that is transferred to the conveyer parts 16a, 16b so that these in order to provide a clamping force onto the cable. Hence, by adjusting the pre-tensioning the spring(s), the clamping force applied onto the cable may be adjusted. This adjustment of the pretensioned mechanical spring may be provided manually by means of a handle, or by means of the clamping drive unit 40 that may be configured to adjust the pre-tensioning of the mechanical spring(s).

In other embodiments of the present disclosure, the spring arrangement may be omitted and the clamping force may be adjusted by the clamping drive unit 40 based on e.g. sensor input by means of a clamping control unit/system configured to operate the clamping drive unit 40 based on the sensor input. This control unit/system may control the position of one or both conveyer devices 16a, 16b and thereby the width of the cable guidance space. In some embodiments, the sensor input may be omitted and the drive unit 40 may merely be configured to arrange the conveyer devices at different, e.g. predefined positions that may e.g. be represented in a data storage.

One or more guides 42, such as linear guides, such as rods or rails, may be arranged to guide the conveyer parts 16a, 16b in the movement towards and away from the cable guidance space 13. These/this 42 may help to provide an improved control of the conveyer parts 16a, 16b and the clamping force applied thereby. The driven clamping part/actuator 41 may in embodiments of the present disclosure be configured to move the socket 30 of the clamping arrangement at which the respective drive device 10, 20 and hence conveyer part 16a, 16b is arranged/mounted.

Both the housing comprising the blowing chamber 4 and the sockets 30 may be connected to the frame 35 such as a common frame 35. The sockets 30 may be movably connected to the frame through the clamping part/actuator 41 and the one or more guides 42. The sockets may also support on/be connected to the frame 35 through one or more rails or the like (not illustrated).

As can be seen, the driven part 14 may be connected to the conveyer part 16a, 16b through one or more force transferring members 14x such as one or more drive belts, drive chains (not illustrated) and or toothed wheels 14x (see FIG. 7). Such force transferring members may enable a movement of the conveyer part(s) towards and away from a cable guidance space.

Hence the drive arrangement part 15 is directly or indirectly driven by the pushing drive unit 50. The coupling arrangement part 14a and the drive arrangement part 15 so the drive arrangement part 15 transfers rotational movement and force from the drive unit to the coupling arrangement part 14a. The coupling arrangement part 14a is connected to the driven part 14, and the driven part 14, such as a shaft is rotationally connected to the base part 10a, 20a by means of one or more bearings (not illustrated). Hence, the driven part 14 transfers the rotational movement and force from the pushing drive unit 50 to the force transferring member(s) 14x which drives, in FIG. 7, the conveyer parts 16a, 16b. In case the drive device(s) is/are replaced by a drive device comprising a conveyer wheel, the conveyer wheel may be coupled directly or indirectly to the driven part 14.

Figures 8, 9:
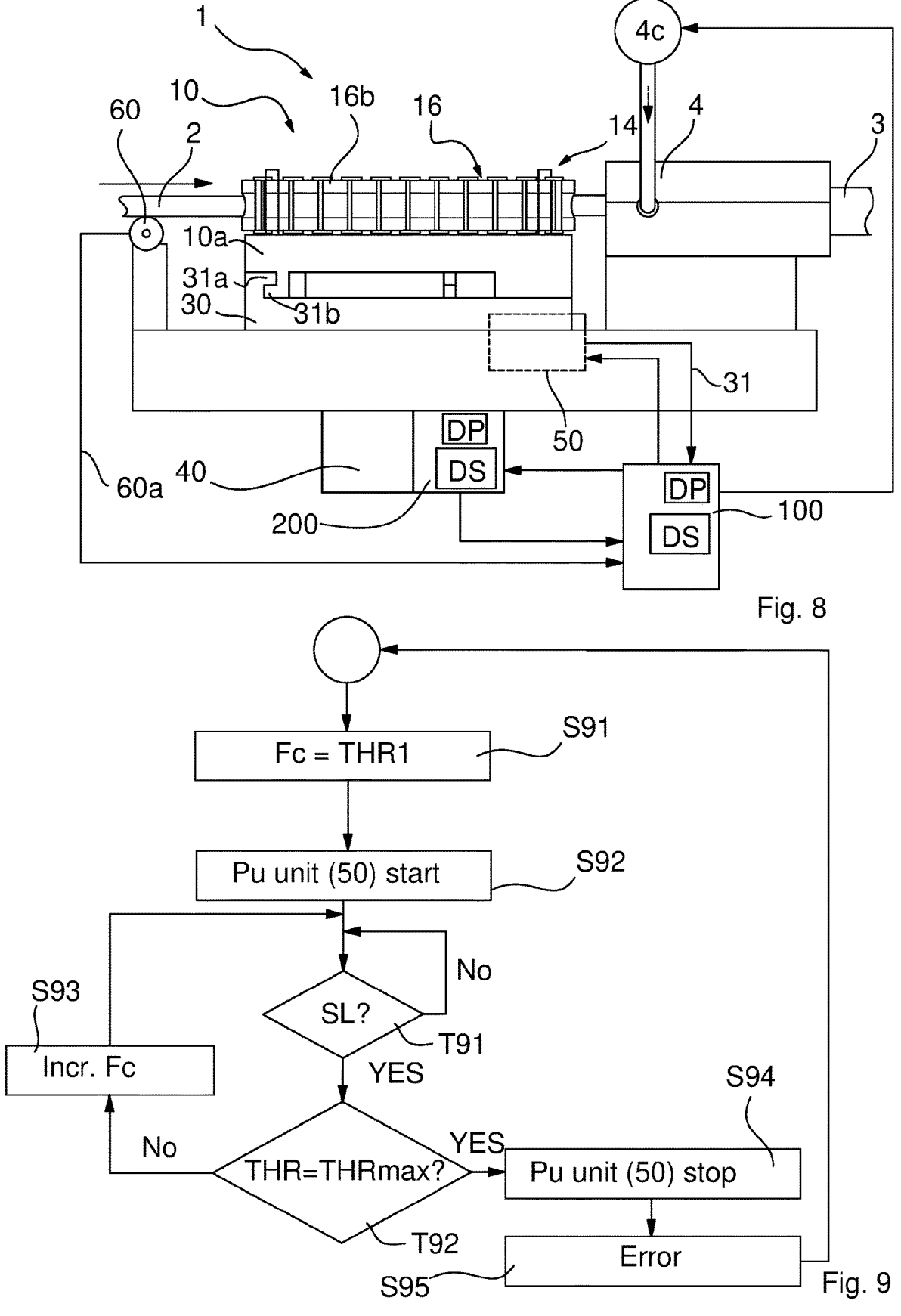
FIG. 8: illustrates an apparatus including a control system according to embodiments of the present disclosure.
FIG. 9: illustrates a flow chart relating clamping force control according to embodiments of the present disclosure.

FIG. 8 illustrates schematically a more detailed, schematic view of a clamping force control system according to embodiments of the present disclosure. As mentioned above, the clamping force control system is configured to control and regulate the clamping force applied onto the cable by means of the conveyer parts 16a, 16b. The clamping force control system in FIG. 8 includes a first controller 100 comprising a first data processor DP. This first controller is configured to communicate clamping settings to a second controller 200 of the apparatus including a second data processor DP and possibly also a data storage DS based on one or more predefined criteria.

The second controller 200 is configured to control/regulate the clamping arrangement based on/according to the communicated clamping setting and e.g. also based on sensor input while the driving force is applied onto the cable by the pushing drive unit 50.

It is generally to be understood that clamping settings may relate to a desired magnitude of a clamping force Fc to be applied onto the cable in the cable guidance space by the conveyer parts 16a, 16b. However, the clamping setting may be or include a value not directly defining a clamping force, but instead define a torque value, a current value or merely just a value within a range that indicates or is representative for a desired clamping force magnitude. For example, in case of a 10 bit clamping force range, 1024 may define the maximum possible clamping force that the clamping arrangement can apply, and e.g. may define 1 defines the minimum clamping force the clamping arrangement can be set to, and the clamping settings may be defined within this range.

The second controller 200 is configured to control the clamping arrangement by controlling the drive unit 40, such as based on sensor input. This sensor input may include clamping force sensor input. Such clamping force sensor input may e.g. comprise information from a torque measurement, a current consumption measurement value or the like and/or other parameters that may provide an indication of the applied clamping force to the cable. The sensor input may additionally or alternatively be provided from a force measurement sensor such as a strain gauge sensor arrangement. The clamping force sensor input may generally be input representative of the force with which the conveying part(s) presses on/clamps the cable and/or the like. It is understood that the sensor input may in embodiments of the present disclosure be sensor input provided from an embedded sensor arrangement of the drive unit 40 or controller 200. An example hereon may be an electric servo motor that may both include the motor 40 and a servo motor controller 200. In certain embodiments of the present disclosure, the second controller 200 may be considered a part of the drive unit 40, for example it may include a servo motor driver comprising drive unit 40 regulation circuitry and software adapted to provide regulation of the drive unit. For example, the drive unit 40 may include a servo motor and a servo motor driver software where e.g. applied torque and/or consumed current information is made available and may be used sensor input that is used directly or indirectly as a regulation parameter for e.g. the applied clamping force. Hence, the servo motor driver may include a regulation circuitry where a torque, current value or the like may be applied as a set point and used as the clamping setting to be complied with. The servo motor driver may hence, e.g., regulate the clamping force during installation of the cable so that when e.g. sudden force peaks appears, the applied clamping force Fc may be temporarily reduced. These sudden forces may, e.g., be provided/occurring due to unevenness on the cable, foreign objects sticking to the cable sleeve exterior or the like entering the cable guidance space.

Generally, the first controller 100 or the second controller 200, may include a feedback control loop circuitry, such as a proportional, integral and/or derivative regulation control loop (also known as a PID control), configured to regulate the clamping force applied based on the sensor input representative of the present clamping force acting on the cable and a desired clamping setting, while the driving force is applied onto the cable by the motor 50. The regulation software may be stored in the data storage DS of the controller 200.

The first controller 100 may be configured to receive user input and/or sensor input and process this input in order to determine a desired clamping setting to be utilized as a regulation parameter for the second controller based on certain criteria such as one or more predefined criteria. The first controller 100 may in embodiments of the present disclosure include a data storage DS comprising a plurality of different, predefined selectable clamping settings.

In some embodiments of the present disclosure, the selectable clamping settings may be associated to different cable types represented in the data storage. Hence, one or more of the clamping settings may be selected based on a selected cable type to be installed by means of the apparatus.

In embodiments of the present disclosure, the selection between the clamping settings for a cable type may be provided based on e.g. detection and/or estimation of slippage between the jacket of the cable and at least one of the conveyer parts 16a, 16b. Hence, for example, a first initial clamping force may be provided and a second, higher clamping setting may be switched to/selected by the clamping force control system 100 if slippage is detected to be above a slippage threshold. Hence, the controller 100 may communicate the new higher clamping setting to the controller 200, and the controller 200 hence controls the drive unit 40 in order to induce the new higher clamping force. This may reduce the slippage as a higher frictional engagement force may hereby be applied onto the cable sleeve according the new clamping setting.

In some embodiments of the present disclosure, the applied higher clamping force may be combined with a pressure increase where the pressure of the fluid in the blowing chamber is increased to increase the fluid drag force inside the duct. This may be obtained by a control unit (not illustrated) comprising a data processor for regulating the pressure and/or flow in the chamber 4 and duct 3, or the controller 100.

It is understood that some slippage between cable sleeve and conveyer part 16a, 16b may be allowed, at least if the applied clamping force is rather low, as this may not damage the cable sleeve. However extensive slippage between the jacket of the cable may influent negatively on the ability to install the cable in the duct, and hence, the clamping force may be increased by the clamping force control system if extensive slippage is detected. The amount of allowed cable slip may in embodiments of the present disclosure be changed dependent on the selected clamping force setting.

In some embodiments of the present disclosure, the moment a slippage is detected, the clamping force control system may induce the second higher clamping setting. In other embodiments of the present disclosure, a certain slippage may be allowed e.g. for a certain amount of time and/or a certain slippage per installed cable length may be allowed before increasing the clamping setting. For example, if slippage is detected over a longer time period and/or the slippage increases from a lower slippage to a higher slippage (e.g. by that an estimated or measured difference between cable movement/installation speed and conveyer part speed increases to above a certain level) the clamping force control system 100, 200 may induce a second higher clamping setting.

For detecting the cable installation speed, a cable movement speed sensor 60, such as including an encoder device configured to be driven by the movement of the cable into the duct, may be provided. This may provide a first speed sensor input 60a to the controller 100. A second speed input 31 directly or indirectly representative of the drive speed of the conveyer part(s) 16a, 16b may be provided, e.g., from the pushing drive unit 50 see FIG. 1) or from a selected, internal speed setting stored in the data storage DS. Based on these inputs, the controller 100 may determine if a slippage is present and/or the amount of slippage present during cable installation, and adjust/switch/change the applied/selected clamping setting based thereon.

In FIG. 8, the cable movement speed sensor is placed away from the drive device(s) 10, 20. But in other embodiments of the present disclosure, a passive conveyer part on a drive device as e.g. previously described may be used as input for an encoder unit to determine the cable movement speed.

The slippage may also be detected by detecting a speed difference between the conveyer parts 16a, 16b in case one of these is a passive counter hold part driven by the cable movement rather than the pushing drive unit 50.

Instead of or in addition to the detection/estimation of slippage, the selected clamping setting may also be adjusted based on one or more of a detected or estimated pushing force F1 applied onto the cable or a derivative thereof)—this information may e.g. be provided by/obtained from the pushing drive unit 50 based on torque information current consumption information or the like, and/or a force sensor arrangement connected for detecting a force change between a frame of the apparatus and e.g. the base 19 (see FIG. 2) or the like.

the applied fluid pressure inside the blowing chamber 4 and/or a fluid path connected thereto, a detected amount/length of cable installed in the tube (e.g. the clamping force may be increased if a certain length of cable is installed in the duct as slippage may in some situations occur more often later on in the installation process)

The apparatus 1 may hence be configured to initially apply a rather limited clamping force according to a first clamping setting onto the cable in the space 13 as this may in many cases be sufficient. In case slippage detection and/or or one or more other parameters fulfills certain predetermined criteria, a second, higher clamping setting configured to be above the first clamping setting is induced by the controller 100 communicating this to the controller 200.

It is however understood that the control provided by the controller 100 and the control provided by the controller 200 in further embodiments of the present disclosure may be integrated into the same controller, e.g. by means of the same data processor DP.

It is also to be understood that the pushing speed provided by the pushing drive unit 50 and determining the speed with which the cable enters the tube, in embodiments of the present disclosure may be controlled by its own control unit (not illustrated) and/or regulation circuitry such as by means of a servo motor driver software or the like separate to the controller 100. The control of the installation speed of the cable may hence also be provided by such a controller based on speed setting received from the control unit 100, or may alternatively be integrated in the same control unit such as the control unit 100. The control unit or units 200, 100 may together provide a control system.

The apparatus 1 may in embodiments of the present disclosure include or be adapted to communicate with a user interface UI such as a graphical user interface. The user interface may include a screen for information presentation for a human user and interaction means such as a touch screen, one or more physical buttons and/or adjustment screws or the like enabling a human user to control the operation of the apparatus. In certain embodiments, the user interface may be connected by a wireless data connection to the control system of the apparatus, e.g. by means of WIFI, Bluetooth and/or the like. The user interface UI may enable direct and/or indirect selection stored clamping force settings, cable types, conduct types, conveyer part 16a, 16b and/or drive device types. These may be selected between a plurality of pre-stored values and/or settings. For example, the user may enter or select cable type information based on information presented on the screen of the user interface, and based thereon a setting for clamping force, and, e.g., also installation speed, fluid pressure and/or the like may be set or suggested automatically by the apparatus.

The control system including the one or more controllers 100, 200 may hence be configured to provide one or more predefined clamping force settings to the clamping drive unit of the apparatus 1, in order to control the magnitude of the clamping force applied onto the cable by the conveyer parts 16a, 16b in the space 13.

For example, in one or more embodiments of the present disclosure, when a human user or the like provides a new clamping force set point, e.g. because the type of cable has been changed and/or the drive device(s) 10, 20 have been exchanged/switched to another type of drive device with a different type of conveyer device(s), the desired clamping pressure/force may be needed to be changed accordingly to protect the cable and also ensure that enough clamping force is provided dependent on, e.g., the cable type. Smaller optical cable types may need/accept a reduced clamping force in order to protect the cable, whereas larger cables with a larger number of optical fibers and/or different jacket solutions may enable usage of higher clamping forces without damaging the cable.

In embodiments of the present disclosure, a control system 100, 200 may be configured to compare clamping force sensor input, and/or a value derived thereof, to a clamping force limit/set value, such as the one or more clamping force settings, and provide an output to the clamping drive unit 40 based thereon in order to assure that the clamping force applied to the cable is maintained around the clamping force limit/set value. This limit/set value should not be too large but should at the same time assure that slip between conveyer parts 16a, 16b and cable jacket is reduced or avoided. This may be controlled also during driving of the cable into the duct 3. The limit/set value may be increased by the control system in case slip is detected.

The clamping force limit value may in aspects of the present disclosure be selected directly or indirectly by a user by means of a user interface of the apparatus.

The data storage(s) DS may include different selectable predefined clamping force settings, and a control system 100 of the apparatus may be configured to control the clamping drive unit 40 directly or indirectly as, e.g., described above based on a selected predefined clamping force setting selected from the data storage. Different predefined clamping force settings may be assigned to different cable types in the data storage. Additionally or alternatively, the predefined clamping force settings may in embodiments of the present disclosure be determined/calculated based on a clamping force algorithm configured to gradually increase the applied clamping force based on sensor information relating to, e.g., detection of slip between cable jacket and drive device, but only up to a maximum clamping force setting. This calculation may additionally or alternatively be based on information of the fluid flow and/or force provided by sensors. Different max. clamping force settings may be assigned for different types of cables and/or different types of drive devices 10, 20 and stored in the data storage. Hence when a slip is detected, a controller 100, 200 increases the clamping force until the slip is reduced.

Hence, the control system(s) 200, 100 may be configured to compare clamping force sensor input, and/or a value derived thereof, to a clamping force limit value, such as the one or more clamping force settings, and provide an output to the clamping drive unit 40 based thereon, in order to maintain the clamping force acting on the cable below a max clamping force threshold such as around a selected or a calculated (by the data processor) clamping force setting.

The increase of clamping force may also be combined with increasing the fluid flow in the duct by regulating a valve (not illustrated) and/or the force unit 4c. This may e.g. be provided by means of command signals such as illustrated by the arrow between controller 100 and device 4c in FIG. 8. This control may be provided based on feedback information from a flow or force sensor (not illustrated).

If the predefined max. clamping force setting is reached, and slip is still detected other measures may be provided such as providing an alarm signal and/or reducing the clamping force to avoid damaging the jacket. The drive speed of the conveyer part(s) may also be reduced.

FIG. 9 illustrates a flow chart relating to the setting of applied clamping forces during operation of the apparatus, according to embodiments of the present disclosure. In step S91, an initial clamping setting is applied. This initial clamping setting may e.g. correspond to 50% below the maximum allowed grip, here represented by the clamping setting THR1. The controller 100 may e.g. either select the value for the initial setting if it is pre-stored in the database, or alternatively calculate the initial clamping setting based on the maximum allowable clamping setting. Then the pushing drive unit 50 is started in step S92. Prior to step S91 or S92, the fluid flow may be initiated into the duct, but in other embodiments, this may also be provided after step S91 or S92 instead.

The clamping force control system hence in test T91 tests if predetermined criteria is complied with, such as if a certain amount of slippage (SL) between cable and conveyer part(s) is detected. For example, if the detected slippage is above a predetermined value (e.g. determined based on a speed difference between cable and conveyer part (and/or derivatives thereof), the clamping force control system may determine that a too high slip is present and hence that the initial clamping force should be increased. Hence test T92 is initiated. Here, it is assured that the presently applied/selected clamping force is not at or above the maximum allowed clamping setting THRmax. If the present applied clamping force is below the maximum allowed clamping setting THRmax, the clamping force control system increases the applied clamping force in step S93.

This may be provided by either selecting another stored clamping setting or be calculated based on the presently applied clamping setting, such as to be a predefined percentage or value above the presently applied clamping setting. For example the applied clamping setting may be increased with between 5% and 20% compared to the present setting.

Then it is again tested (test T91) weather a too large slippage is still detected, and if it is, the clamping force may be increased again (step S93). Hence, this may provide a gradual increase in the applied clamping setting and hence applied clamping force based on the present situation, until a maximum clamping setting (THRmax) is reached (test T92). If too large slippage is detected (T91) and the maximum allowed clamping setting is already applied in this situation (T92), the controller may stop the pushing unit 50 and present or transmit an error message to the user, such as by means of the previously described user interface UI. See steps S94 and S95. This may also be combined with reducing the clamping force.

It is understood that in embodiments of the present disclosure, a position setting may be used instead of the clamping force setting, and/or as a supplement to the clamping force setting.

It is understood that a first predefined clamping force settings (such as predefined values or a predefined algorithm) may be configured to be assigned for use when a drive device 10, 20 including a conveying system of a first type is installed at the apparatus. A second clamping force setting may be configured to be assigned for use when a drive device 10, 20 including a conveying system of a second type is installed at the apparatus.

Figures 10A, 10B:
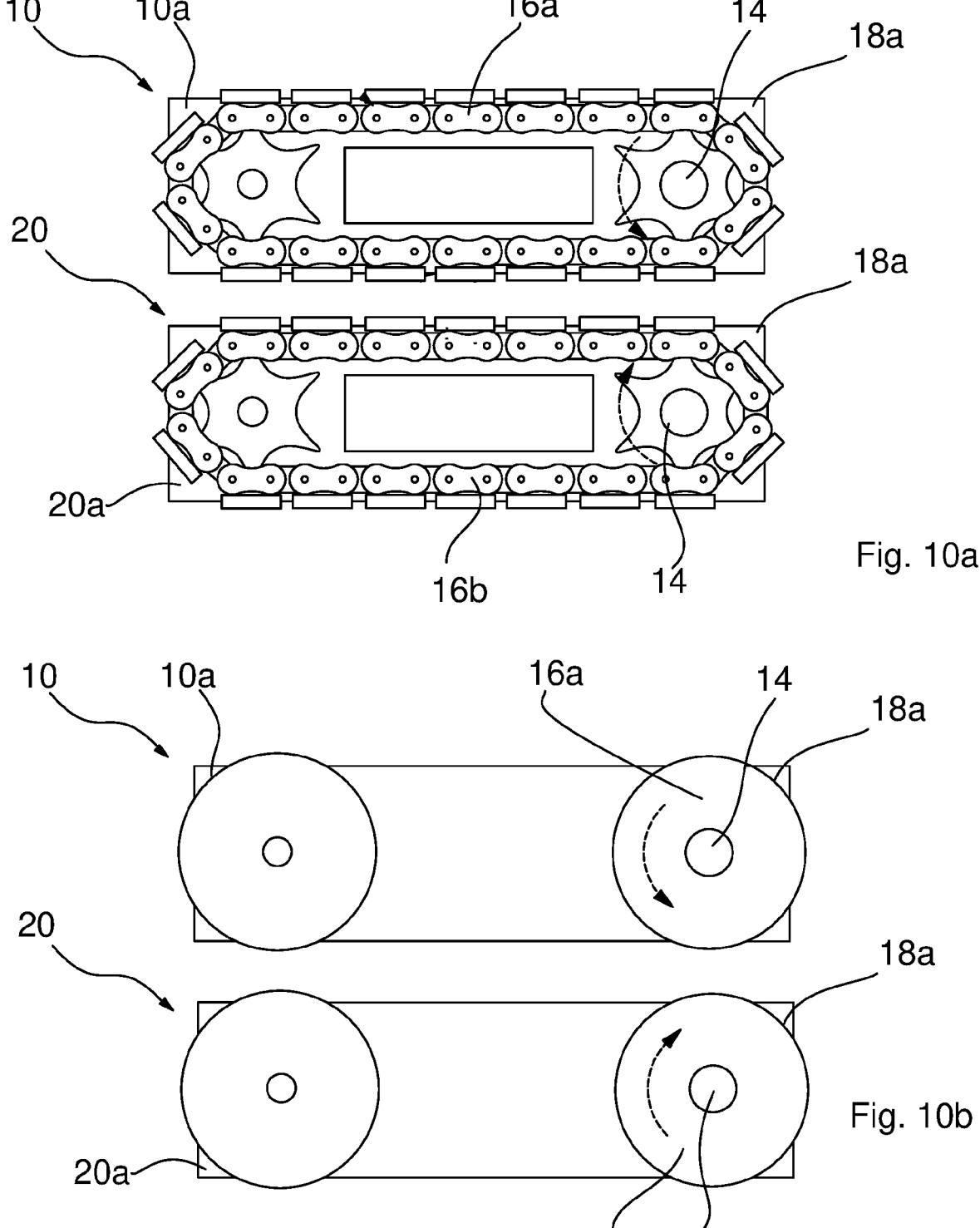
FIGS. 10*a*-10*b*: illustrates two sets of drive devices according to embodiments of the present disclosure.

FIGS. 10a and 10b illustrates a set of drive devices according to embodiments of the present disclosure, including different conveyer part 16a, 16b types, which may be installed in an apparatus 1 as described. The conveyer parts of the type illustrated in FIG. 10b includes one or more drive wheels 16a, 16b for driving the cable 2 into the duct by frictional engagement. The conveying system of the second type illustrated in FIG. 10a includes one or more conveyer chains 16a, 16b for driving the cable into the duct by frictional engagement. The leftmost wheel in FIG. 10b may be a passive wheel for guidance of the cable, whereas the rightmost wheel is a conveyer wheel driven by the shaft 14 that is connected to the pushing drive motor when the drive device is installed at the socket on the apparatus.

Each drive device 10, 20 includes a base part 10a, 20a, a conveyer part 16a, 16b and a coupling arrangement part (not illustrated in FIGS. 10a, 10b) configured to engage with a drive arrangement part 15 of the apparatus 1. As illustrated in e.g. FIGS. 1-6, the base part 10a, 20a may include one or more locking parts of the locking system configured to be disconnectably connected to locking parts of the apparatus 1, such as locking parts of the socket 30 so that the base part 10a, 20a is maintained in a locked position at the socket part 30. The set of drive devices can be installed at a socket 30 of the apparatus 1 in order to fulfill user needs with regard to the present installation situation, e.g. In case that the user wishes to switch between different drive device types 16a, 16b but use the same apparatus. A pushing drive unit 50 such as an electrical servo motor may allow operation with conveyer part types as it may provide a proper control over a wider range. Additionally or alternatively, a clamping drive unit 40 such as an electric servo motor may allow for proper control of the clamping force applied and/or clamping force range available when switching between conveyer parts of different types. However, it is understood that in some embodiments of the present disclosure, the drive unit 40 and/or 50 (see previous description) may, e.g., include a hydraulic or pneumatic motor or the like.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. An apparatus for installing a cable into a duct, with the assistance of a fluid drag on the cable within the duct, the apparatus comprising:
   a blowing chamber having a cable inlet, a cable outlet, and a fluid inlet for receiving a supply of pressurized fluid, wherein the cable outlet is configured to be connected to the duct;
   a pushing drive;
   a first drive device comprising a first conveyer part;

a second drive device comprising a second conveyer part, wherein the first conveyer part and the second conveyer part are arranged at opposing sides of a cable guidance space and wherein one or both of the first conveyer part and the second conveyer part are configured to induce a driving force (F1) onto a part of the cable arranged in the cable guidance space;

wherein one or both of the first conveyer part and the second conveyer part is configured to be moved towards and away from the cable guidance space;

wherein the first drive device comprises a first base part at which the first conveyer part is mounted and/or the second drive device comprises a second base part at which the second conveyer part is mounted;

wherein one or both of the first drive device and the second drive device comprises a coupling arrangement part configured to engage with a drive arrangement part of the apparatus, wherein the drive arrangement part is configured to be driven by the pushing drive;

wherein the first conveyer part and/or the second conveyer part is arranged to be driven by the drive arrangement part of the apparatus; and wherein the first base part and/or the second base part is disconnectably connected to a socket part of the apparatus and is maintained in a locked position by a lock locking system, and wherein the coupling arrangement part engages with the drive arrangement part of the apparatus when the base part is connected to the socket part in the locked position.

2. The apparatus according to claim 1, wherein one or both of the first conveyer part and the second conveyer part is/are configured to be moved towards and away from the cable guidance space by movement of the socket part.

3. The apparatus according to claim 1, wherein a clamping drive unit comprising an electric servo motor is configured to adjust an amount of the clamping force provide by one or both of the first conveyer part and the second conveyer part onto the cable in the cable guidance space based on input from a control.

4. The apparatus according to claim 1, wherein the first drive device and/or the second drive device is configured to be mounted on the socket part by providing a displacement of the corresponding first base part and/or second base part towards the socket part, and by providing an interlocking operation in order to engage locking parts of the first drive device with locking parts of the apparatus.

5. The apparatus according to claim 1, wherein the socket part comprises one or more first parts of the locking system, and wherein the first base part and/or the second base part comprises one or more second parts of the locking system, and wherein the one or more first parts of the locking system of the socket part is/are configured to engage with the one or more second parts of the locking system of the first base part and/or the second base part.

6. The apparatus according to claim 1, wherein the locking system comprises a spring loaded engagement part arranged at the base part and/or the socket part, wherein the spring loaded engagement part is configured to engage with a recessed portion when the first base part and/or the second base part is in the locked position, and wherein the spring loaded engagement part is configured to be forced towards a disengagement position by a part of the corresponding first drive device and/or second drive device compressing or stretching a spring member when a disengagement force is provided onto the first drive device and/or second drive device.

7. The apparatus according to claim 1, wherein the pushing drive comprises a drive motor configured to rotate the drive arrangement part and thereby one or more of the first conveyer part and the second conveyer part so as to induce the driving force (F1), wherein the drive motor is an electrical servo motor.

8. The apparatus according to claim 1, wherein the apparatus comprises a control configured to provide one or more control outputs to the pushing drive and/or a clamping drive, wherein the control comprises one or more data processors (DP) configured to provide the one or more control outputs based on input from one or more input sources.

9. The apparatus according to claim 1, wherein a control is configured to provide one or more predefined clamping force settings to a clamping drive of the apparatus, in order to control a magnitude of a clamping force applied onto the cable by the first conveyer part and the second conveyer part.

10. The apparatus according to claim 9, wherein a first of the predefined clamping force settings is configured to be assigned for use when the first drive device comprises a conveying system of a first type is installed at the apparatus, and wherein a second of the predefined clamping force settings is configured to be assigned for use when the first drive device and/or the second drive device comprises a conveying system of a second type is installed at the apparatus.

11. The apparatus according to claim 1, wherein a control is configured to control a clamping force applied onto the cable by the first conveyer part and the second conveyer part based on clamping force sensor input.

12. The apparatus according to claim 1, wherein a control is configured to provide one or more speed setting outputs in order to control a speed with which the pushing drive drives one or both of the first conveyer part and the second conveyer part.

13. The apparatus according to claim 1, wherein the first base part of the first drive device and/or the second base part of the second drive device comprises a top surface and a bottom surface, wherein the corresponding first conveyer part and/or second conveyer part is arranged at a top surface side of the corresponding first base part and/or second base part, and wherein the coupling arrangement part is arranged at and/or accessible from a bottom surface side of the corresponding first base part and/or second base part.

14. The apparatus according to claim 1, wherein one or both of the first conveyer part and the second conveyer part is/are connected to a driven part through one or more force transferring members arranged at one or both of the first drive device and the second drive device, such as wherein the driven part is connected to coupling arrangement part so as to be driven by the drive arrangement part of the apparatus.

15. The apparatus according to claim 1, wherein the locking system comprises one or more locking parts configured to be displaced between a locking position and an unlocking position, and wherein the one or more locking parts, in the locking position and when one or both of the first drive device and the second drive device is mounted at the socket part, is/are configured to maintain one or more other locking parts of the locking system in an engaged, locked configuration.

16. The apparatus according to claim 1, wherein a clamping drive of the apparatus is configured to control movement of one or both of the first conveyer part and the second conveyer part towards and away from the cable guidance space based on input from a control.

17. A drive device for installation on an apparatus for installing a cable into a duct, wherein the drive device comprises:

a base part;

a conveyer part configured to induce a driving force (F1) onto a part of a cable;

a driving part configured to drive the conveyer part;

a coupling arrangement part directly or indirectly connected to the driving part, wherein the coupling arrangement part is configured to engage with a drive arrangement part of the apparatus;

wherein the base part comprises one or more locking parts configured to be disconnectably connected to locking parts of the apparatus so that the base part is maintained in a locked position at a socket part, and wherein the coupling arrangement part is configured to engage with the drive arrangement part of the apparatus when the base part is arranged at the socket part in the locked position.

18. The drive device according to claim 17, wherein the base part comprises a top surface and a bottom surface, wherein the conveyer part is arranged at a top surface side of the base part, and wherein the coupling arrangement part is arranged at and/or accessible from a bottom surface side of the base part.

19. The drive device according to claim 17, wherein the conveyer part is connected to the driving part, through one or more force transferring members arranged at the drive device.

20. A method of adapting an apparatus for installing a cable, into a duct, with the assistance of a fluid drag on the cable within the duct, to be used for installation of different cable types, wherein the apparatus comprises:

a blowing chamber having a cable inlet, a cable outlet, and a fluid inlet for receiving a supply of pressurized fluid, wherein the cable outlet is configured to be connected to the duct;

a pushing drive;

a first drive device comprising a first conveyer part; and a second drive device comprising a second conveyer part, wherein the first conveyer part and the second conveyer part are arranged at opposing sides of a cable guidance space and wherein one or both of the first conveyer part and the second conveyer part are configured to induce a driving force (F1) onto a part of the cable arranged in the cable guidance space;

wherein one or both of the first conveyer part and the second conveyer part is configured to be moved towards and away from the cable guidance space;

wherein the first drive device comprises a first base part and/or the second drive device comprises a second base part at which the corresponding first conveyer part is of a first type and/or the second conveyor part is of a first type is mounted, and a coupling arrangement part configured to engage with a drive arrangement part of the apparatus, wherein the drive arrangement part is configured to be driven by the pushing drive;

wherein the first conveyer part of the first type and/or second conveyer part of the first part is arranged to be driven by the drive arrangement part of the apparatus;

wherein the method comprises:

disconnecting one or more of the first drive device and the second drive device comprising the corresponding first conveyer part of the first type and/or the second conveyer part of the first type from the apparatus;

providing one or more other drive devices comprising a coupling arrangement part configured to engage with the drive arrangement part of the apparatus, and either the first base part or the second base part at which a conveying part system of a second type is mounted; and connecting the one or more other drive devices to a socket part so that the coupling arrangement part engages with the drive arrangement part of the apparatus.

* * * * *